(12) United States Patent
Aparicio et al.

(10) Patent No.: US 9,059,927 B2
(45) Date of Patent: Jun. 16, 2015

(54) NETWORK TRAFFIC PROFILE AGGREGATION FOR EFFICIENT DISCRETE EVENT SMART GRID NETWORK SIMULATIONS

(75) Inventors: Juan Aparicio, Blue Bell, PA (US);
Amar H. Patel, Piscataway, NJ (US);
Nazif Tas, Lawrenceville, NJ (US);
Michael T. Loiacono, Cary, NC (US);
Justinian Rosca, West Windsor, NJ (US)

(73) Assignees: Siemens Corporation, Iselin, NJ (US);
Siemens Industry, Inc., Alpharetta, GA (US)

( * ) Notice: Subject to any disclaimer, the term of this patent is extended or adjusted under 35 U.S.C. 154(b) by 393 days.

(21) Appl. No.: 13/590,463

(22) Filed: Aug. 21, 2012

(65) Prior Publication Data
US 2013/0060554 A1 Mar. 7, 2013

Related U.S. Application Data

(60) Provisional application No. 61/527,212, filed on Aug. 25, 2011, provisional application No. 61/527,211, filed on Aug. 25, 2011, provisional application No. 61/527,207, filed on Aug. 25, 2011.

(51) Int. Cl.
*G06F 17/50* (2006.01)
*H04L 12/24* (2006.01)
(Continued)

(52) U.S. Cl.
CPC .............. *H04L 41/145* (2013.01); *G01R 21/00* (2013.01); *G06F 17/5004* (2013.01);
(Continued)

(58) Field of Classification Search
CPC ............ G06F 17/5004; G06F 17/5009; G06F 2217/78; G01R 21/00; G01R 21/06; Y04S 40/22; Y04S 10/30; Y04S 20/224; Y04S 20/42; Y04S 20/48; Y04S 60/74; H04L 41/145; H02J 13/0079; Y02B 90/246
USPC ................... 703/13; 709/226, 224; 713/189;
370/252, 230, 242, 254, 235, 352;
340/870.02; 463/1
See application file for complete search history.

(56) References Cited

U.S. PATENT DOCUMENTS 5,809,282 A * 9/1998 Cooper et al. ................ 709/226
6,278,963 B1 8/2001 Cohen
(Continued)

OTHER PUBLICATIONS

A.G. Longley and P. Rice, "Prediction of tropospheric radio transmission loss over irregular terrain, a computer method—1968." ESSA Technical Report ERL. 79-ITS 67 Institute for Telecommunication Sciences, Tech. Rep., 1968.
(Continued)

*Primary Examiner* — Kandasamy Thangavelu

(57) ABSTRACT

Systems and methods are provided for modeling and simulating a communication network operating under at least one communication protocol, which supports a Smart Grid electricity network. Communication performance data of the communication network are generated by a processor based on operating behavior of the Smart Grid with a plurality of assets under a first condition. Devices in the Smart grid are grouped in bins for rapid modeling. One or more different configurations of the communication network are entered into the processor and related performance data is also generated. Network configurations are compared based on the generated performance data which may include end-to-end delay and reception rate. Processor based systems to perform modeling methods are also provided.

10 Claims, 39 Drawing Sheets

(51) Int. Cl.
*G01R 21/00* (2006.01)
*G01R 21/06* (2006.01)
*H02J 13/00* (2006.01)

(52) U.S. Cl.
CPC ........... *G01R 21/06* (2013.01); *G06F 2217/78* (2013.01); *G06F 17/5009* (2013.01); *H02J 13/0079* (2013.01); *Y02B 90/246* (2013.01); *Y04S 10/30* (2013.01); *Y04S 20/224* (2013.01); *Y04S 20/42* (2013.01); *Y04S 20/48* (2013.01); *Y02E 60/74* (2013.01)

(56) References Cited

U.S. PATENT DOCUMENTS

| | | | | |
|---|---|---|---|---|
| 7,869,354 | B2 * | 1/2011 | Balakrishnan et al. | 370/230 |
| 8,010,643 | B2 | 8/2011 | Gray | |
| 8,195,443 | B2 | 6/2012 | Mallory | |
| 2004/0153303 | A1 | 8/2004 | Tang et al. | |
| 2005/0169186 | A1 * | 8/2005 | Qiu et al. | 370/242 |
| 2005/0265321 | A1 * | 12/2005 | Rappaport et al. | 370/352 |
| 2008/0084330 | A1 * | 4/2008 | Picard | 340/870.02 |
| 2008/0232272 | A1 * | 9/2008 | Gelbman et al. | 370/254 |
| 2010/0085887 | A1 * | 4/2010 | Ray et al. | 370/252 |
| 2010/0317420 | A1 * | 12/2010 | Hoffberg | 463/1 |
| 2011/0047264 | A1 * | 2/2011 | Hilpert et al. | 709/224 |
| 2011/0164527 | A1 * | 7/2011 | Mishra et al. | 370/252 |
| 2012/0105074 | A1 * | 5/2012 | Pamulaparthy et al. | 324/538 |
| 2013/0036311 | A1 * | 2/2013 | Akyol et al. | 713/189 |
| 2013/0114409 | A1 * | 5/2013 | Iovanna et al. | 370/235 |

OTHER PUBLICATIONS

G. Deconinck, "An evaluation of two-way communication means for advanced metering in Flanders (Belgium)," in Instrumentation and Measurement Technology Conference Proceedings, 2008. IMTC 2008. IEEE. May 2008. pp. 900-905.

"United States Department of Energy, Energy Information Administration, 2011 Energy Outlook."

S. Galli, A. Scaglione and Z. Wang, "For the grid and through the grid: The role of power line communications in the smart grid," CoRR, vol. abs/1010.1973, 2010.

* cited by examiner

- 1 packet applications
    - AMI traffic
    - DR traffic
        - Pricing signals
        - Load profiling PUSH

- Protocol applications
    - AMI traffic
        - Load profiling PULL
        - Load shed request
    - Electric Vehicles
    - Feeder Automation

FIG. 16

| | Frequency | Latency | Bandwidth | Protocol | Security | Real-time | One/Two Way | Reliability |
|---|---|---|---|---|---|---|---|---|
| AMI | 1 day | 2-15 sec | 10-100kbps/node | OpenADR | high | no | one | 99-99.99% |
| DR | 5 min. | 500 ms - several min. | 14-100kbps/node | OpenADR | high | no | one/two | 99-99.99% |
| FA | 0.33 seconds | 80ms | 5-12kbps/node in multicast to every node | IEC 61850 GOOSE | high | yes | two | 99.99-99.9999% |
| Mobile resources | | | | | | | | |
| Renewable generation | 4min. | ? | ? | ? | ? | ? | ? | ? |
| EV | event based | low(?) | ? | ISO-IEC V2G C/IEC 61850 | high | yes | two | 99-99.999% |
| Mobile Workflow Management | event based | low(?) | ? | ? | high | yes | two | 99-99.999% |
| Situational awareness, wide area control, and monitoring | | | | | | | | |
| Video | ? | 20 ms - 200ms | 600-1500kbps | ? | high | yes | one | ? |
| Computed data | ? | high(?) | ? | IEC 60870-5 / DNP3 | high | no | one | ? |
| Data Intelligent electronic devices IED | periodic (?) | medium(?) | ? | None | ? | no | ? | ? |
| Phasor measurement units PMU | periodic (?) | medium(?) | ? | IEEEC37.118 | ? | no | one | ? |
| Protection events | event based | low(?) | ? | IEC 60870-5 / DNP3 | ? | yes | two | ? |
| Storage and Distribution | ? | 20ms -15 sec | 9.6-56kbps | ? | high | no | one | 99-99.99% |
| Electric transportation | ? | 2sec- 5 min | 9.6-100kbps | ? | medium | no | one | 99-99.99% |
| Grid management | ? | 100ms - 2 sec | 9.6-100kbps | ? | high | yes | two | 99-99.99% |

FIG. 17

NETWORK TRAFFIC PROFILE AGGREGATION FOR EFFICIENT DISCRETE EVENT SMART GRID NETWORK SIMULATIONS

STATEMENT OF RELATED CASES

The present application claims priority to and the benefit of U.S. Provisional Patent Application Ser. No. 61/527,207 filed on Aug. 25, 2011, U.S. Provisional Patent Application Ser. No. 61/527,211 filed on Aug. 25, 2011 and U.S. Provisional Patent Application Ser. No. 61/527,212 filed on Aug. 25, 2011, which are all three incorporated herein by reference.

BACKGROUND OF THE INVENTION

The present invention relates to Smart Grid (SG) communication networks. More in particular it relates to the simulation of Smart Grid communication and evaluation of different SG communication options based on different constraints based on the simulation.

The Smart Grid (SG) communication network is expected to be robust enough to handle various applications with unique requirements in terms of frequency of packets, packet size, delay, etc. Large scale simulations of SG communications, if feasible, would be valuable to identify the robustness issues. In accordance with various aspect of the present invention a toolkit has been developed to evaluate a mix of Smart Grid applications under specific network, topology and geographical constraints using a discrete event simulator. In one embodiment of the present invention the discrete event simulator is the OPNET Modeler®. The OPNET Modeler® and related products are developed and marketed by OPNET Technologies, Inc. of Bethesda, Md. The methods provided herein apply in general to any discrete event simulator that models a Smart Grid communications network.

Current simulation models of SG communications that include large numbers of users require very long simulation times and do not consider all relevant constraints.

Accordingly, novel and improved methods and systems for large scale simulations of SG communications which capture environmental characteristics such us terrain profile and population density and that mimic realistic results are required.

SUMMARY OF THE INVENTION

Aspects of the present invention provide systems and methods to model a communication network that supports an electrical Smart Grid. Operating behavior of the Smart Grid generates communication traffic in the communication network. The communication network operates under at least one communication protocol. Based on operating conditions of the Smart Grid the model can generate a network performance scoring index. The scoring index can be based on low level statistics such as communication delay and message reception rate, gives an indication of how successful the studied communication protocol was for supporting the studied application.

Communication traffic from a plurality of devices in a network supporting a Smart Grid utility is generated in a processor based simulator and is aggregated at an aggregation node such as a base station. The traffic is generated based on at least one pre-set traffic generating parameter in each device. One parameter is a user rate, for instance in packets or bytes per time unit. The aggregated traffic is transmitted from the aggregation node via a channel to a receiving node such as a control center. The channel has defined signal transmission characteristics which determine a transmission capacity or a transmission quality, such as a packet reception rate. The packet reception rate can be determined by the processor from the channel characteristics and the aggregated traffic that will be provided to the channel. Based on a network configuration, including device parameters, aggregated traffic is generated of which a reception rate is determined based on channel characteristics. If a pre-determined value of a quality measure such as a reception rate is not met device parameters or network configuration such a user rate of one or more devices can be modified in such a way that the aggregated traffic can be transmitted from aggregation node to receiving node at the pre-determined reception rate. In the alternative, channel characteristics are modified to accommodate aggregated traffic transmission at a pre-determined reception rate.

In accordance with an aspect of the present invention a method is provided to simulate a communication network with a plurality of nodes in a Smart Grid electricity network, comprising a processor determining one or more sources for traffic over the communication network by selecting one or more parameters associated with each of the one more sources of traffic for each of a plurality of communication protocols, the one or more parameters including at least a packet size and a transmit time, determining transmit times for the one or more sources of traffic for each of the plurality of communication protocols by selecting one or more parameters including at least a simulation time and a delay, creating inter arrival times, weights and distributions of traffic sources, creating a plurality of traffic models for the one or more sources based on each of the prior steps, inputting each of the plurality of traffic models into a network simulator.

In accordance with a further aspect of the present invention a method is provided, further comprising making recommendations of a communication model based on an output of the network simulator.

In accordance with yet a further aspect of the present invention a method is provided, wherein the network simulator is an OPNET® network simulator.

In accordance with yet a further aspect of the present invention a method is provided, wherein the communication network is a wireless mesh network.

In accordance with yet a further aspect of the present invention a method is provided, further comprising the network simulator performing a first simulation based on a first data file, the network simulator performing a second simulation based on a second data file and comparing a configuration of the communication network based on the first data file with a configuration of the communication network based on the second data file.

In accordance with yet a further aspect of the present invention a method is provided, further comprising: a processor determining a quality measure for simulated traffic transmitted from the plurality of nodes to a base station node to a receiving node based on a communication constraint between the base station node and the receiving node and the processor modifying at least one of the one or more parameters if the quality measure is determined to be unacceptable.

In accordance with yet a further aspect of the present invention a method is provided, further comprising: determining a user rate for the one or more sources of traffic based on the quality measure.

In accordance with another aspect of the present invention a system is provided to simulate a communication network with a plurality of nodes in a Smart Grid electricity network, comprising: a memory storing a plurality of communication protocols, each protocol related to a Smart Grid application, a processor in communication with the memory, the processor programmed to perform the steps: determining one or more sources for traffic over the communication network by selecting one or more parameters associated with each of the one more sources of traffic for each of the plurality of communication protocols, the one or more parameters including at least a packet size and a transmit time, creating a traffic model for the one or more sources, generating simulated traffic for the one or more sources of traffic based on the traffic model that is aggregated at an aggregation node, setting a desired quality measure for the simulated traffic received at a receiving node in communication with the aggregation node and modifying at least one parameter of the one or more traffic sources to satisfy the required quality measure.

In accordance with yet another aspect of the present invention a system is provided, wherein the quality measure is related to a user rate of the one or more sources under a traffic model.

In accordance with yet another aspect of the present invention a system is provided, wherein the quality measure is an overall packet reception rate.

In accordance with yet another aspect of the present invention a system is provided, wherein the overall packet reception rate is at least 90%.

In accordance with a further aspect of the present invention a method is provided to simulate a communication network with a plurality of nodes, including an aggregation node connected by a communication channel with a receiving node in a Smart Grid electricity network, each node being enabled to transmit data packets in support of a plurality of Smart Grid applications, comprising: a processor determining an aggregation of data packets representing data traffic at the aggregation node in the communication network as a result of a Smart Grid application installed on a plurality of devices, the data traffic being determined by at least one parameter at each of the plurality of devices, setting a desired quality measure for data packets transmitted from the aggregation node to the receiving node, determining if the desired quality measure is met and modifying the at least one parameter to satisfy the quality measure if the desired quality measure is not met.

In accordance with yet a further aspect of the present invention a method is provided, wherein the quality measure is based on a transmission characteristic of the communication channel.

In accordance with yet a further aspect of the present invention a method is provided, further comprising: modifying the communication channel to meet the quality measure.

In accordance with yet a further aspect of the present invention a method is provided, wherein the at least one parameter is a user rate.

In accordance with yet a further aspect of the present invention a method is provided, wherein the processor obtains a statistical distribution of data packets representing data traffic at a node in the communication network as a result of the Smart Grid application from a stored traffic model.

In accordance with yet a further aspect of the present invention a method is provided, wherein the communication network is a wireless mesh network.

In accordance with yet a further aspect of the present invention a method is provided, further comprising: a discrete event simulator performing a first simulation based on a first data file representing traffic data at the aggregation node in accordance with a first plurality of parameters, the discrete event simulator performing a second simulation, based on a second data file representing data traffic at the aggregation node in accordance with a second plurality of parameters and comparing a configuration of the communication network based on the first data file with a configuration of the communication network based on the second data file.

The system can perform all of the method steps described above and below.

BRIEF DESCRIPTION OF THE DRAWINGS

FIG. 16 illustrates a property of communication rules applied in accordance with an aspect of the present invention;

FIG. 17 is a table which illustrates communication network properties;

DETAILED DESCRIPTION

Figure 1:
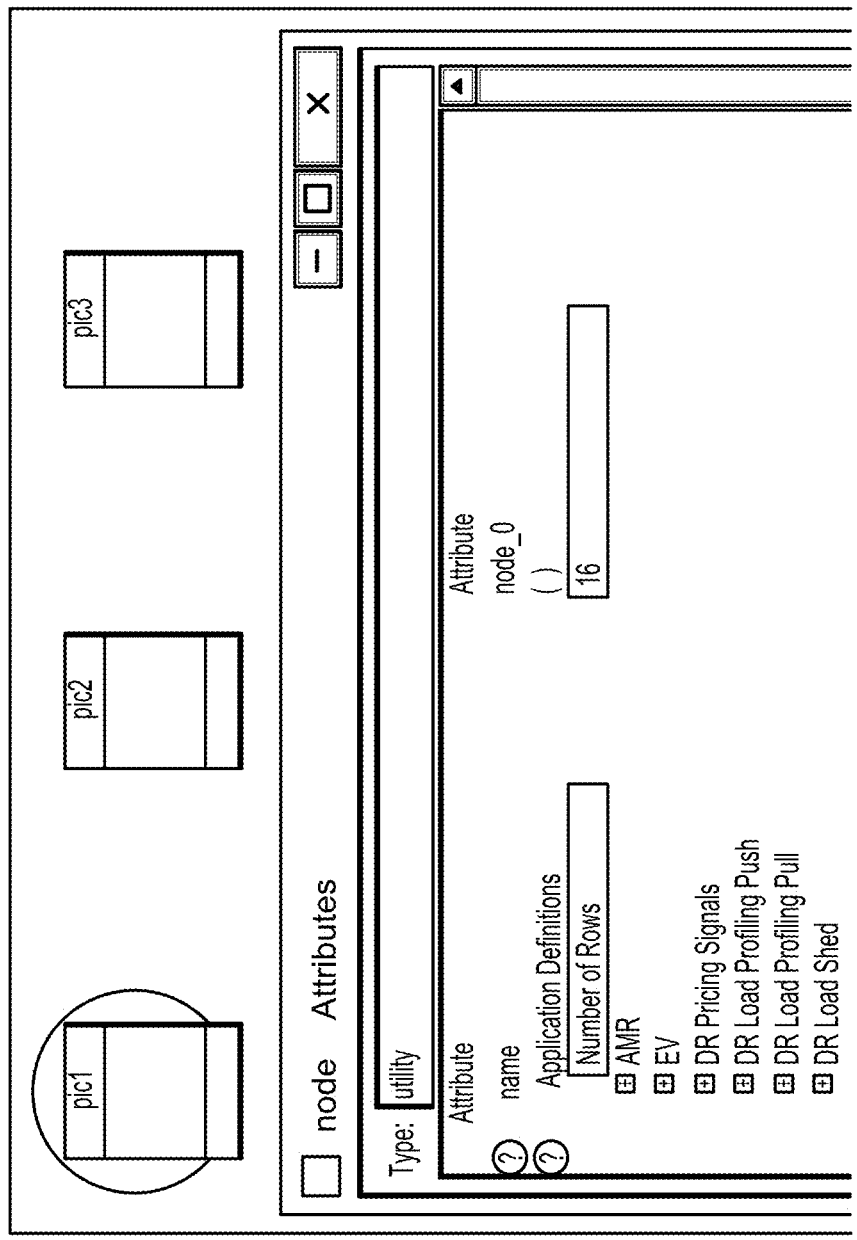
FIG. 1 illustrates attributes of the modeled network in accordance with an aspect of the present invention.

New Smart Grid applications will be supported via the deployment of robust information and communication infrastructures, which will enable the exchange of large quantities of data and control commands between the Smart Field Devices (home electricity meter or pole-top devices such as reclosers, capacitor banks, switches, sectionalizers, etc.) and the utility's Control Center. Currently, utilities from all over the world are facing transformations in their infrastructures and are assessing which available technology will satisfy their requirements. The long-term success of their strategic objectives, such as improved efficiency, integration of renewable energies or increased consumer engagement will directly rely on the communication infrastructure that they deploy today.

Good decisions are not straightforward in the vast landscape of available communication technologies (e.g. RF-Mesh, cellular, WiMax, Power-line Communication (PLC), point to point RF, private Wi-Fi). The choice of an optimal technology depends on a large numbers of factors, such as types of applications deployed, existing technology infrastructure, and the geographical characteristics of the deployment region.

In order to address the aforementioned challenges and assist utility companies to individually migrate and modernize their communication infrastructures, the Smart Grid Communications Assessment Tool (SG-CAT) has been developed, which is capable of simulating a mix of Smart Grid applications under various geographical topologies and topographies, user orientations, and applications configurations. Throughout herein the above tool will be identified with the acronym SG-CAT.

SG-CAT has been designed to exploit a discrete event network simulator, which allows it to reproduce realistic scenarios and simulate complex Smart Grid applications using a broad range of wireless protocols and technologies, such as Long-Term Evolution (LTE), WiMax, RF-Mesh or Private Tower systems.

Smart Grid Application Library for a Discrete Event Simulator

The ultimate goal of any Smart Grid deployment is to reach a level of robustness, reliability and security that allows the full implementation of a plethora of Smart Grid applications with different requirements and characteristics. In order to accomplish this target, detailed knowledge about these applications and their associated traffic models is essential. The following Table I summarized the characteristics of a number of Smart Grid applications to date.

TABLE 1

| | Requirements | | | |
|---|---|---|---|---|
| Application | Frequency | Latency | Bandwidth | Real-time |
| AMI | low | High | ~10 kb/message/node | Low |
| DR | medium | medium/high | 14-100 kbps/node | low/medium |
| FA | high | Low | 50-200 kbps | High |
| EV | event based | medium/high | 9.6-56 kbps | medium/high |

In the above TABLE 1 AMI means "Advanced metering infrastructure"; DR means "Demand Response"; FA means "Feeder Automation" and EV means "Electric Vehicle." A different characterization of Smart Grid applications is in three groups of electric utility Smart Grid applications: (1) Delivery Management and Optimization, (2) Demand Management and Optimization and (3) Asset Management and Optimization. These applications in one embodiment of the present invention include: Advanced Meter Reading, Remote connect/disconnect, Outage detection/last gasp, Fault location, isolation and service restoration (FLISR), Feeder automation (NOP/load balancing), Volt/VAR (reactive power) optimization, Faulted Circuit Indicator (FCI) Telemetry, Voltage regulator bank control, Transformer monitoring, Substation Remote Terminal Unit (RTU) connectivity, Demand response—baselining, Demand response—load control.

The performance of these applications in real environments will vary based on the communication technologies used to deploy them, the geographic elements (terrain and land use types) of the location and the topological nature (number of devices and location) of the network. Which technologies would be able to optimally handle all the communication requirements? What is the necessary throughput? Can all these applications be implemented in the existing utility's networks? General application requirements such low latency and high bandwidth are not enough to answer such questions. The actual application definitions need to be considered such as the packet size, the packet generation timing, synchronization among devices, etc. Without considering these aspects, packet collisions or network bottlenecks can't be understood, In order to answer such questions insight is needed from large scale simulations that will allow reproducing realistic deployments.

With this goal in mind, an entire library of Smart Grid applications has been developed in accordance with one or more aspects of the present invention and the corresponding traffic models using discrete event simulators such as the modeling tools available in OPNET®. These tools enable a detailed definition of the different tasks included in each application and all the phases for each task, as can be seen in FIG. 1, wherein AMR means Automatic Meter Reading, EV means Electric Vehicle and DR means Demand Response.

The following applications are used:

A. Advanced Metering Infrastructure (AMI)

AMI is the first block, on top of which utilities can develop an entire library of Smart Grid applications. It allows direct connection between the Utility Servers and the user home Meters. It includes capabilities such us remote measurement readings, remote management as for instance described in [1] G. Deconinck, "An evaluation of two-way communication means for advanced metering in Flanders (Belgium)," in Instrumentation and Measurement Technology Conference Proceedings, 2008. IMTC 2008. IEEE. May 2008. pp. 900-905 and remote reporting as for instance described in [2] D. Hart, "Using AMI to realize the Smart Grid." in Power and Energy Society General Meeting—Conversion and Delivery of Electrical Energy in the $21^{st}$ Century, 2008 IEEE, July 2008, pp. 1-2. The infrequent uplink transmission and the short length of the packets have been reflected in the definition of the AMI tasks and phases as applied.

B. Automated Demand Response (ADR)

While the main beneficiaries of AMI are the utilities, through remote measurement readings, in the case of ADR both the utility companies and the customers will be able to take profit from its implementation. The utilities will be able to avoid peak consumption (and its associated high costs due to peak generation of energy) and the customers can save money by shifting their demands over time according to the real-time pricing schedules broadcasted by the Utility as described for instance in [3] S. Valero. M. Ortiz. C. Senabre, C. Alvarez, F. Franco, and A. Gabaldon, "Methods for customer and demand response policies selection in new markets," *Generation, Transmission Distribution, IET*, vol. I, no. 1. pp. 104-110, January 2007. In ADR, the packet transmission is more frequent and the response should be quick enough for granting the proper service operation. Included in the OPNET library provided in accordance with various aspects of the present invention are methods for PULL and PUSH the information with different frequencies and packet sizes.

C. Feeder Automation (FA)

Automated supervision and control of substations allows overall coordination in case of emergencies and optimizations of operating costs. The communication system is a vital part of the wide area power system relaying and coordination. Relays isolate local failures in generation, transmission and distribution so that they do not spread to other parts of the grid. Distribution feeder automation refers to substation equipment for the detection, location and isolation of faults and a means to restore power to undamaged sections of lines. This functionality is referred to as Fault Location, Isolation and Supply Restoration (FLISR). A typical feeder system includes a circuit breaker and at least three of the following types of switching devices along the line: reclosers, disconnect switches, sectionalizers, airbreak switches and fuses.

Distribution networks need to evolve and transform the static and conventional grids into dynamic and reliable smart grids. Optimizing the operation and maintenance and improving the overall coordination in case of emergencies are challenges that the new grid will face. In order to accomplish these goals, a robust and trustworthy communication system is needed. However, nowadays, the level of communication and automation along the feeder and the distribution substations is really basic and will not be able to handle the future smart grid applications in security and isolation. In one embodiment a system distributes logic amongst relays to implement a decentralized control system. In an emergency, the fault location, isolation and supply restoration should be done as fast as possible. Thus the communication technology should be fast enough for handling fast transmissions with extremely low delay, as for instance described in [4] A. Smit. "Distribution Feeder Automation using IEC61850 GOOSE Messaging over WIMAX Wireless Communications." Several technologies (GPRS, PLC, WIMAX, etc) have been proposed but there is no silver bullet that covers all applications. Therefore, simulations of different scenarios and technologies need to be performed.

D. Electric Vehicle Charging (EV)

Electric Vehicles will cause a significant growth in the energy demand in the upcoming years as described in [5] "United States Department of Energy, Energy Information Administration, 2011 Energy Outlook." This and other studies show that Electric Vehicles will have a penetration of 5% of the market by 2020 and they will continue to grow even faster over the following years. This means that millions of vehicles need to be integrated into the power supply infrastructure. A large fleet of EVs needs to be managed in an intelligent way in order to optimize and control the charging of their batteries without generating uncontrollable load peaks. During the charging process, car chargers will need to communicate with the utility servers in a fast, secure and cost-efficient way. A realistic simulation of the different proposed standards (SIP, IEC61850, etc) is necessary for a realistic evaluation of the communication requirements. EV application presents different real time characteristics depending on the scenario: roadside chargers need to finish the process as soon as possible, while in-house chargers can schedule the charging for a longer period of time.

E. Others

As the grid gets more and more intelligent, the number of possible applications will increase. New applications, such us Mobile Workflow Management, Renewable Sources Monitoring, etc, will require more demanding channels with higher throughput and lower latency, specially for emergency situations and video surveillance applications. The herein provided library will allow the testing of such applications in realistic environments for evaluating the future performance of the Smart Grid communication networks.

Challenges of Implementing Smart-Grid Applications for Discrete Event Simulation In order to model and evaluate the different communication capabilities of a given Smart Grid deployment and guide Smart Grid application implementations, the Smart Grid Communications Assessment Tool (SG-CAT) has been developed.

Figure 2:
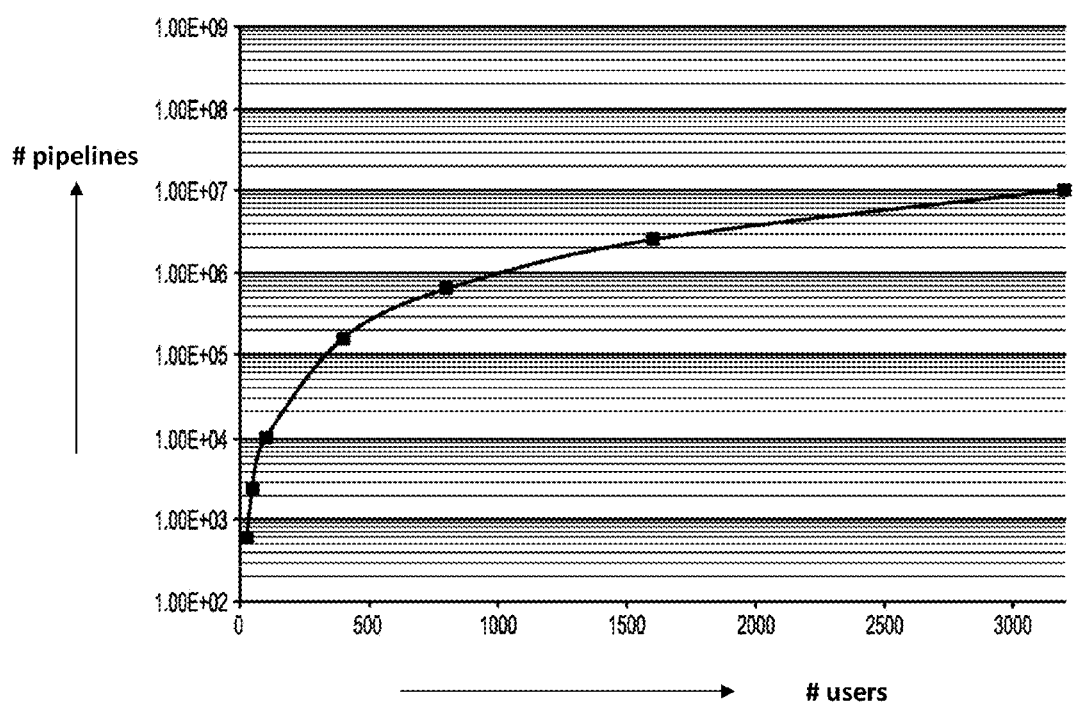
FIGS. 2 and 3 illustrate a performance of a simulation model as a function of the number of simulated users.

OPNET® was chosen as a basis for the herein provided communication simulation tool due to its powerful and high-fidelity simulation and modeling capabilities. OPNET® allows to creating a complete library of applications, to evaluate their behavior with different communication technologies, and perform simulations with realistic terrain. Although the OPNET Modeler® is powerful, modeling an entire network with thousands of wireless nodes, e.g. LTE or ZigBee, is still a challenging task because of computational limitations with scale-up. For wireless nodes, OPNET Modeler® creates message passing pipelines between each pair of nodes that represents the wireless medium from every user's perspective. As a result, the number of pipelines increases quadratically with the number of users, as shown in FIG. 2. Therefore, real scale simulations are challenging in discrete events simulators including OPNET for large scale simulations, especially wherein a simulation involves thousands and up to hundreds of thousands of devices. It is to be understood that such a challenge exists for any discrete event simulator that has to simulate very large numbers of devices in a utility over a significant period of time. The methods and approaches as provided herein in accordance with one or more aspects of the present invention are intended to be applicable and applied to discrete event simulators.

Figure 3:
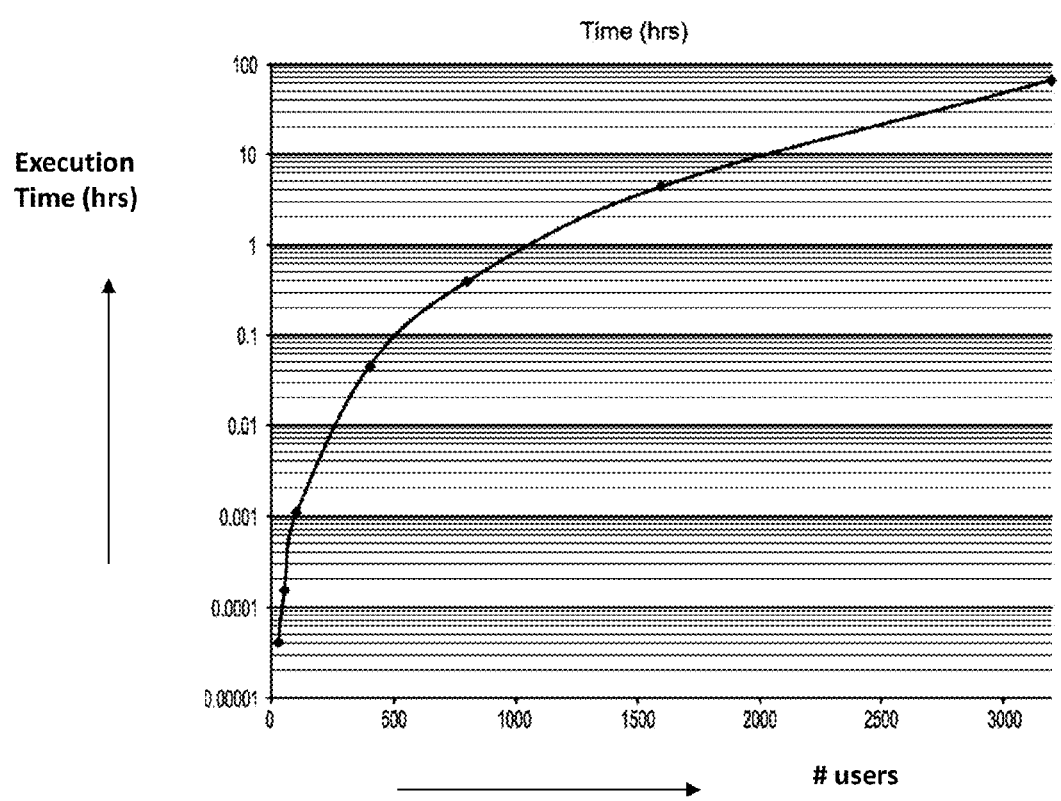

FIG. 3 shows the effect the number of users has on simulation execution time. The Opnet Modeler® is installed on a Dell Precision T7500 workstation that is equipped with Windows 7 (64-bit), 12 Intel Xeon X5650 @ 2.67 GHz (dual-core) processors, and 24 GB of RAM. The Opnet DES Kernel was configured as optimized, sequential, and 64-bit addressing space. (It should be noted that a parallel setup was attempted, but it showed no increase in execution time.) The simulation setup was for a Zigbee deployment for a simulation length of 2 hrs. Note that simulation time increases from just half a second for 50 nodes to over 65 hours for 3200 nodes, which suggests $O(n^4)$ time complexity.

In accordance with the discussion above, the number of message passing pipelines and the execution time are correlated.

Another challenge is due to the interest in studying RF Mesh technology in the Smart Grid. The OPNET library contains the Zigbee RF Mesh model. However, unlike many of the other models available in the library, the Zigbee application process does not make use of OPNET's standard application model object. Thus, it is currently impossible to use the Smart Grid application library for Zigbee studies, since the library has been developed within this framework. Presently, the Zigbee application process only allows nodes to behave as single traffic generators.

Although results will not be provided, it should be mentioned that a similar LTE deployment takes orders of magnitude longer to simulate. Additionally, the built-in efficiency modes (i.e. physical layer disabled) cannot be used to speed up simulation time, since one interest is in observing physical layer statistics and the effect of terrain and topology configurations.

It is also expected that a large scale power line communication or PLC network will be significantly faster. However, at present, PLCs are not a viable option as Medium Voltage/Low Voltage (MV/LV) transformers are known to kill PLC signals as described in [6] S. Galli, A. Scaglione and Z. Wang, "For the grid and through the grid: The role of power line communications in the smart grid," CoRR, vol. abs/1010.1973, 2010. Until research allows communications through them, wireless alternatives seem to be the best option for Smart Grid communication. However, non-wireless communication technologies, including PLC networks are specifically included herein as an aspect of the present invention.

Approaches to Address Simulation Challenges

In order to accomplish realistic wireless simulations for a Smart Grid network with a large number of nodes, the challenges discussed above must be addressed sufficiently and effectively. The first step in the process of solving these challenges is to clearly identify an objective of the simulations in order to redefine them to a perspective of interest. This principle will be used below.

Scale-up Challenges

The first task in determining how to address the issue of large scale simulation is identifying the minimum number of Meters that is needed to be studied. That is, ideally it would be desirable to simulate the entire service area of a utility (potentially having more than 100K Meters). However, considering the network in a hierarchical fashion, it is realized that it is made up of multiple small sub areas, namely individual cells containing a single takeout tower. The individual cells are interconnected via a backhaul to the central location and from a cell perspective behave independently, which indicates that it may be sufficient to study the cells sequentially.

It is not uncommon to find single cells that enclose about 1000-5000 Meters, which provides a huge scale-up advantage over the initial problem of 100K Meters with multiple cells. However, even this scale-up factor may not be sufficient enough as FIG. 3 suggests that networks of 5000 nodes could potentially still take on the order of weeks to simulate. As a result, it is apparent that even further node reduction is required.

If one wants to study overall throughput constraints in a communication network and reduce the number of simulation nodes, the most direct strategy is to group the nodes into "aggregated-nodes", where each of the resultant nodes will transmit the sum of the individual nodes' traffic. This strategy can be optimal when one wants to study the capacity at the access point or in the backhaul area. Unfortunately, one would lose individual behavior and statistics, which are critical elements in evaluating Smart Grid applications.

Since one interest is in observing individual level statistics, such as end-to-end delay, scale up techniques must preserve a certain level of individualism. Although it seems like a tough task, certain assumptions and constraints imposed by the Smart Grid network help to simplify the problem.

Firstly, one can expect the network within a cell to have a somewhat balanced nature when the Meter density is high, since a typical suburban layout promotes a repetitive pattern. As the number of users increase, the probability that the resultant network will be scattered reduces. This observation is used to an advantage when creating the present consolidation rule in accordance with an aspect of the present invention, which is detailed further below.

Secondly, one benefits from the realization that for the non-real time Smart Grid applications, nodes are not required to transmit simultaneously (and will not, due to technological constraints). As a result, a pseudo-scheduler that organizes the transmission times to minimize channel access clashes is applicable. In real-time applications, such as Feeder Automation, the number of nodes is expected to be low and such applications are not as susceptible to scale-up issues as others.

Figure 5:
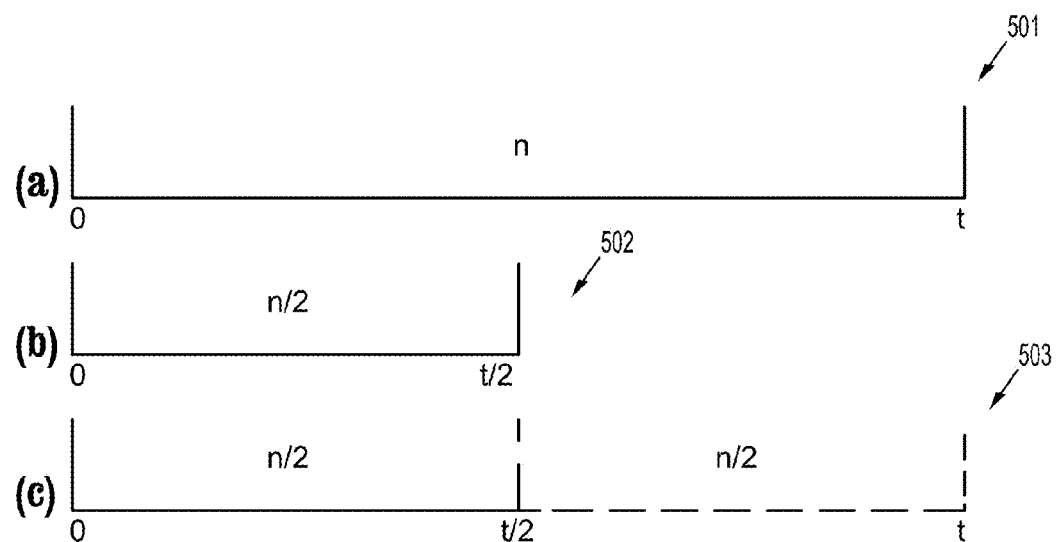
FIG. 5 illustrates node consolidation in accordance with an aspect of the present invention.

The issue of large scale simulation for viewing individual level statistics is solved as an aspect of the present invention by introducing a method of consolidation that uses the principle of statistically independent time bins. This method can be explained as follows: assuming there are n users in the cell and all must transmit within t seconds, one can visually represent the transmission behavior of the network as a single bin of length t, capacity of n and average inter-arrival time of t/n (as shown in FIG. 5, graph 501). Similarly, a network of n/2 users and a transmit interval of t/2 seconds would have the same average inter-arrival time t/n (as shown in FIG. 5 graph 502b). Notice that if there is a second t/2 bin next to the first one, a scenario is generated (as shown in FIG. 5, graph 503) that is strikingly similar to the first one with n users. Hence, hypothetically, scenarios as illustrated in 501 and 503 might be equivalent in terms of the network behavior observed and the statistics gathered. It might be sufficient to execute a smaller (thus quicker) simulation to get the same results as the original larger scenario. However, for this hypothesis to be true, the following conditions must be met:

1) The user transmission times must be distributed uniformly over time as otherwise the number of transmissions per bin (i.e. inter-arrival times throughout the entire simulation) would not be consistent. As the amount and the frequency of traffic generated in Smart Grid applications are rather small compared to other traditional applications, the network is expected to function near optimal with minimum number of clashes, if large transmit times (t) are assumed. Hence, this behavior can be approximated with a network scheduler that assigns arbitrary transmission times to each user with a uniform distribution.

2) The users that are split into different bins must be of a similar nature in order to exhibit an independent nature of each bin. If this criterion is not met, then each bin would behave differently and must be simulated separately. As typical Smart Grid deployments include several Meters located in close geographic proximity, the transmission characteristics of such Meters will be of a similar nature. In accordance with an aspect of the present invention a similarity includes a similarity in channel characteristics between the Meter and a tower. This may be expressed in a transmission loss or similar characteristics. In one embodiment of the present invention two Meter related channels are deemed to be similar if their path loss over a pre-defined frequency range does not differ more than 3 dB. In one embodiment of the present invention two Meter related channels are deemed to be similar if their path loss over a pre-defined frequency range does not differ more than 1 dB. In one embodiment of the present invention two Meter related channels are deemed to be similar if their path loss over a pre-defined frequency range does not differ more than 0.5 dB.

In one embodiment of the present invention one criterion for two Meters being similar is its distance to a tower. For instance, two Meters meet at least one criterion for similarity if their distance to a tower is the same within a 20% margin; two Meters meet at least one criterion for similarity if their distance to a tower is the same within a 10% margin; and two Meters meet at least one criterion for similarity if their distance to a tower is the same within a 5% margin.

In one embodiment of the present invention one criterion for two Meters being similar is its presence in a common neighborhood, for instance as defined by an area. For instance, two Meters meet at least one criterion for similarity if they both are located within an area of 25,000 m². For instance, two Meters meet at least one criterion for similarity if they both are located within an area of 10,000 m². For instance, two Meters meet at least one criterion for similarity if they both are located within an area of 1,000 m².

When at least both of the criteria of transmission path and uniform distribution are met, one is able to create the so-called ghost bins as illustrated in FIG. 5, graph 503. Hence, this enables to justify the equivalence of scenarios illustrated in 501 and 503 and validates that simulating scenario illustrated in 502 with n/2 users produces similar network behaviors a would be observed if scenario illustrated in 501 with n users was simulated.

Figure 4:
FIG. 4 illustrates Meter clustering in accordance with an aspect of the present invention.

With Smart Grid deployment in mind, FIG. 4 shows an example of the consolidation algorithm where groupings of ten nearby Meters have been identified allowing each of these clusters to be represented by a single node. The groupings are identified as the light lines tracing grouped Meter areas. For illustrative purposes areas 401, 402 and 403 are highlighted. Using this strategy allows to simulate only this single node, since the remaining nine nodes will be scheduled to transmit in one of the nine ghost bins subsequently. Hence, a cell that fits the criteria can be simulated quicker, since one is able to represent a single cell which was made-up of, for example, 5,000 nodes with only 500.

In accordance with an aspect of the present invention, a determination of a similarity of communication channels of electricity devices such as smart meters related to a node such as a wireless tower is performed automatically or interactively by a computer. A topologic or topographic map is applied in accordance with an aspect of the present invention to determine a path loss for a wireless channel over a terrain with certain topological features. Accordingly, a computer can decide from a digitized map that meters located within a predefined area of a tower will have similar transmission channels to the tower. A user can assist in marking the digitized map for areas that would be considered as preferred areas for combining into bins, as shown for instance in FIG. 4. A computer can also group certain areas, based on location, such as street names, pre-defined neighborhoods and the like.

In accordance with an aspect of the present invention a computer searches one or more topological maps of pre-defined areas and selects meter locations with a similar loss to a tower as being enabled to be placed in one of a plurality of bins.

Application Challenges in Mesh Networks

As mentioned before, currently OPNET Modeler® does not include a wireless mesh technology, e.g. Zigbee, which is compatible with the application, task and profile objects available in the OPNET® palette. As a result, one is precluded from assigning multiple applications to a single node as well as designing new applications that require two way communications.

For this challenge, again advantage is taken of the non-real time behavior of Smart Grid applications by creating a super-application that aggregates the traffic of all the applications in one node with certain statistical distributions for the size and the inter-arrival time between packets. Knowledge of the application behavior allows to create packet distributions that can be applied to the mesh nodes.

Figure 6:
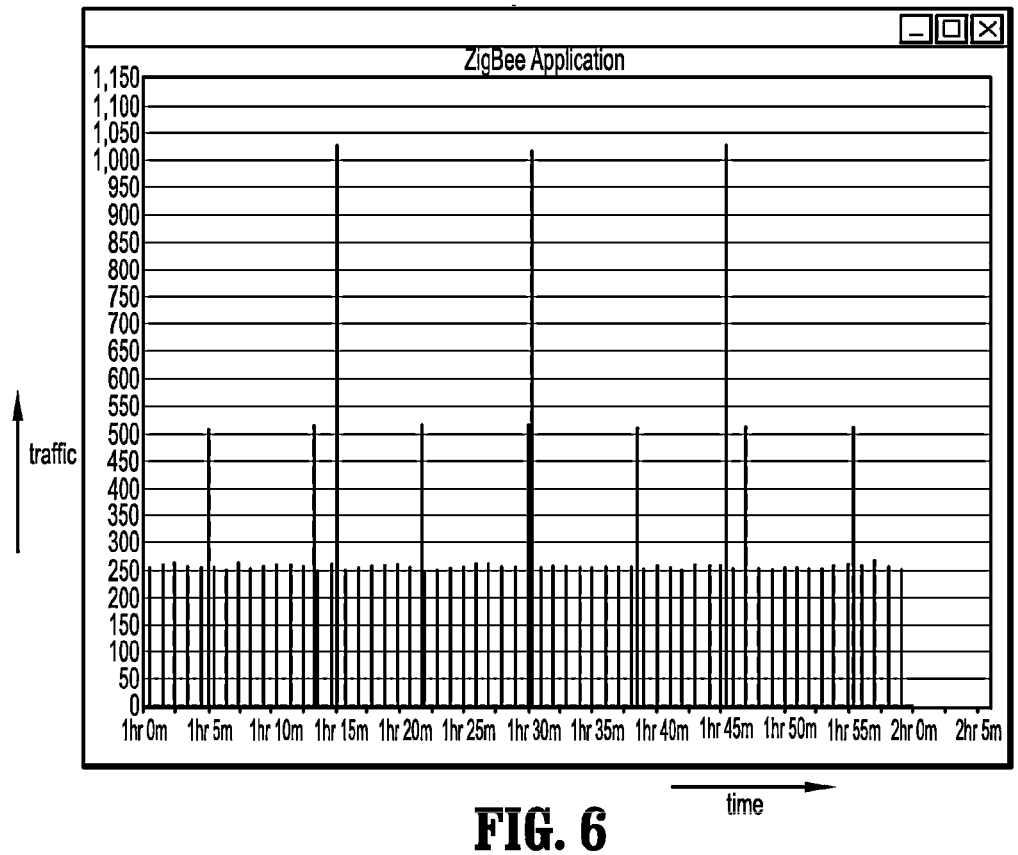
FIG. 6 illustrates network traffic in accordance with an aspect of the present invention.

FIG. 6 illustrates the multi application throughput from a node using EV, AMR and DR. The method provided herein in accordance with one or more aspects of the present invention allows to model this entire traffic pattern within a single distribution. Using this distribution mesh nodes are created that emulate the behavior of multi-application nodes.

Results

Testing of the consolidation method as described above is described next. For the simulations networks were created based on typical US suburban towns, which obey common Smart Grid deployment assumptions; hence, outlined conditions for the herein provided methods are met. Findings for the consolidation methods from the perspective of reception rate and end-to-end delay are also provided.

Figure 7:
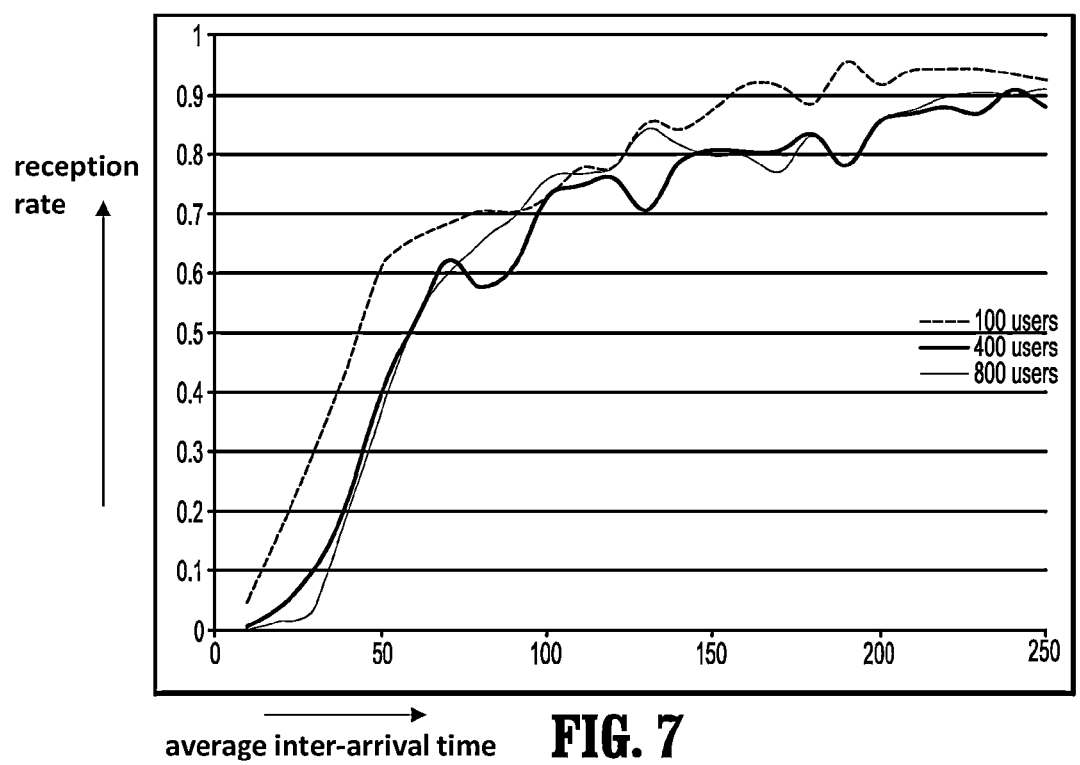
FIGS. 7-10 illustrate network performance in accordance with one or more aspects of the present invention.

FIG. 7 displays the reception rate (number of packets received divided by the number of packets transmitted) for varying scenario sizes as the average inter-arrival time increases. It is observed that regardless of the number of users, average inter-arrival time has a similar affect on reception rate. Moreover, the level of this similarity tends to diverge as the consolidation factor (i.e. the number of ghost bins used) increases, which intuitively suggests that further consolidation erodes the independence condition for having ghost bins (emulating 5,000 nodes with a single node may be too optimistic!). Hence, for reasonable consolidation factors, the herein provided consolidation method is expected to perform well and create smaller networks (which are much easier to simulate) that closely behave the same as the original network of interest.

Figure 8:
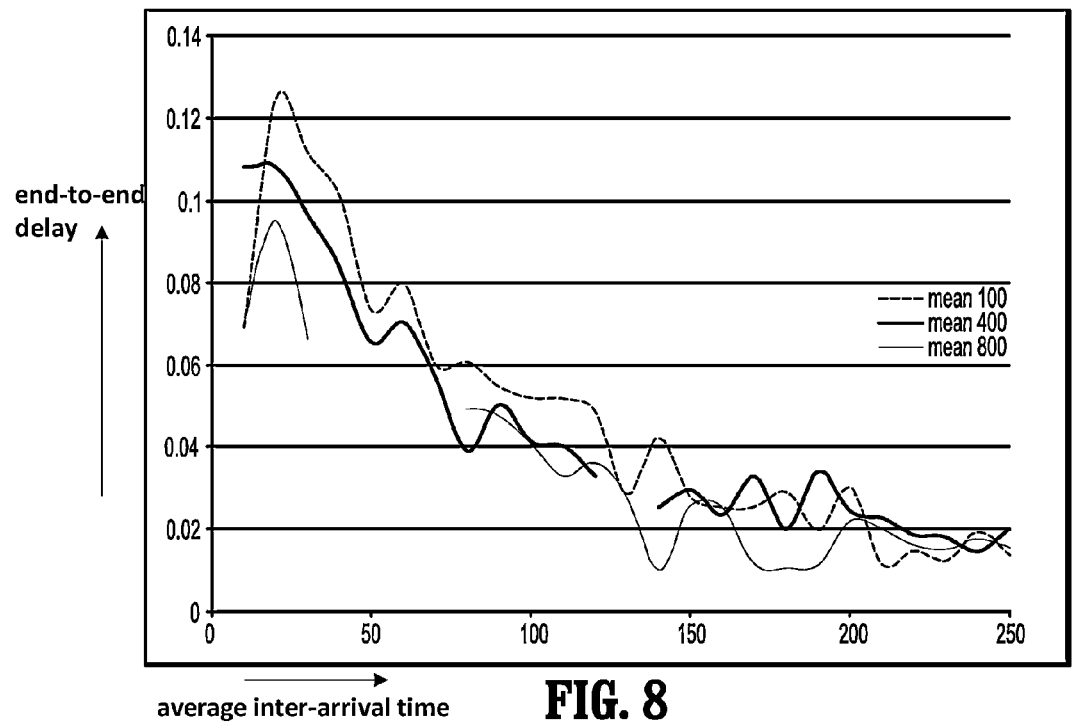

In FIG. 8, the effect of average inter-arrival time on end-to-end delay is further investigated. Particularity for Smart Grid applications end-to-end delay is an important statistic so as to allow a certain level of service. In accordance with the results gathered in FIG. 7 it is observed that regardless of the number of users, average inter-arrival time has a similar affect on end-to-end delay.

Hence, if reception rate and end-to-end delay are the statistics of interest, then the herein provided methods can be used safely without loss of accuracy of the results.

Further Communication Challenges

Terrain information is important in large scale studies, as hilly regions offer different challenges compared to flat regions. When considering the signal attenuation of a transmitter as a function of distance, many path loss models exist. Free space pathloss is not valid after some distance as foliage and obstacles begin to play a role. The Suburban pathloss model defined in V. Erceg, "An empirically based path loss model for wireless channels in suburban environments," IEEE JSAC., vol. 17, no. 7 pp. 1205-1222, 1999 and which is incorporated herein by reference shows that wireless communication in an outdoor environment is affected by the amount of hilliness and tree density in the region.

Such an empirical model provides better results than free space on average, as it accounts for signal attenuators in the region. However, even such models rely on simple one-slope characterization of pathloss, which does not consider particular variations of the terrain. It is important to take the height of the antennas and the particular horizon seen by the antennas into account, since even connectivity might not be possible. Longley Rice described in A. G. Longley and P. Rice, "Prediction of tropospheric radio transmission loss over irregular terrain, a computer method-1968." ESSA Technical Report ERL. 79-ITS 67 Institute for Telecommunication Sciences, Tech. Rep., 1968, which is incorporated herein by reference, is one such model that considers freespace propagation, ground reflection, terrain diffraction and for long antenna distances, scattering.

Figure 9:
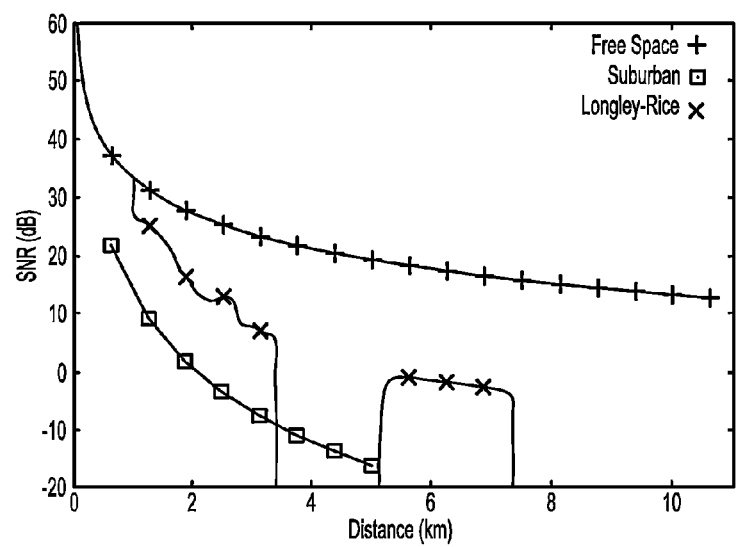

FIG. 9 illustrates the pathloss for the three models.

In an RF-Mesh deployment, the effective range of communication heavily depends on the absolute altitude and orientation of the transmitter and receiver. Access points and relays are typically mounted on pole tops and other high locations, whereas Smart Meters are more likely to be found closer to the ground. A Smart Meter herein is an electricity usage meter with two way communication capabilities and A Meter-to-AP hop would be the final hop, a Meter-to-relay hop would be used to overcome the coverage gaps, and a Meter-to-Meter hop would be used to form a long-range multi-hop mesh network. In a cellular deployment, the terrain profile between a Meter and base station directly impacts whether connectivity can be established or not. Unlike an RF-Mesh deployment, a cellular network cannot use intermediate devices to relay information and keep connectivity.

Regardless of technology in use, since all users share the same medium, the number of users in the network impacts the quality of service in terms of expected latency, delay jitter and achieved throughput. In extreme cases, it may even cause the network to collapse. Since each communication technology handles additional users differently, the network size should be considered carefully during the network planning phase.

The Smart Grid Communications Assessment Tool

Smart Grid applications and the different communication technologies supporting them present unique challenges in coverage, delay and reliability due to real-world terrain constraints, details of real-world deployment, user density and implementation details. For this reason a detailed study and simulation of the individual utility's network should be performed. In order to address these challenges the Smart Grid Communications Assessment Tool (SG-CAT) has been provided herein in accordance with various aspects of the present invention, which is capable of simulating a mix of Smart Grid applications under various geographical topologies, user orientations and application configurations. SG-CAT models and evaluates the communication capabilities of a given Smart Grid deployment, develops a list of communication options to consider and offers recommendations.

SC-CAT has been built on top of a discrete event simulator. In one embodiment of the present invention such simulator is the network simulator OPNET Modeler®, which is a powerful discrete event network simulator that provides high-fidelity modeling and detailed analysis for very large wired and wireless networks. The different OPNET Modeler® solutions enable the users to model various kinds of networks using a broad range of wireless protocols and technologies in realistic scenarios which take the effects of the terrain, the mobility of the nodes and multiple pathloss models into consideration.

SG-CAT enables the analysis of possible network topologies for diverse utility requirements and existing architectures, topology scale-up and analysis of end-to-end behavior of customized Smart Grid applications. Furthermore, it allows the user to tune up different network parameters and evaluate growth scenarios for performance studies. In addition, SG-CAT provides the capability of incorporating power systems components through co-simulation with an electric power network/transmission network simulator, such as the Siemens PSS®E simulation system, marketed by Siemens AG of Munich, Germany. Multiple co-simulation systems can run simultaneously and exchange information (such as boundary conditions, events, time steps, control signals, etc.) in a collaborative manner within the SG-CAT environment. This allows performing hybrid complex Smart Grid simulations that let the users understand the interactions at the design and analysis stages.

The following illustrates several aspects of the SG-CAT tool.

Simulation Setup

The following configuration was used to apply in the illustrative SG-CAT simulation. The RF-Mesh and cellular technologies are chosen as a focus of an analysis. The RF-Mesh module, based on IEEE's 802.15.4 g SUN work group specification, operates in the unlicensed 902-928 MHz ISM band with QAM64 modulation at 100 kbps. For testing the cellular technology an LTE network configured for 10 MHz Frequency Division Duplex was used.

Simulation Results

Figure 10:
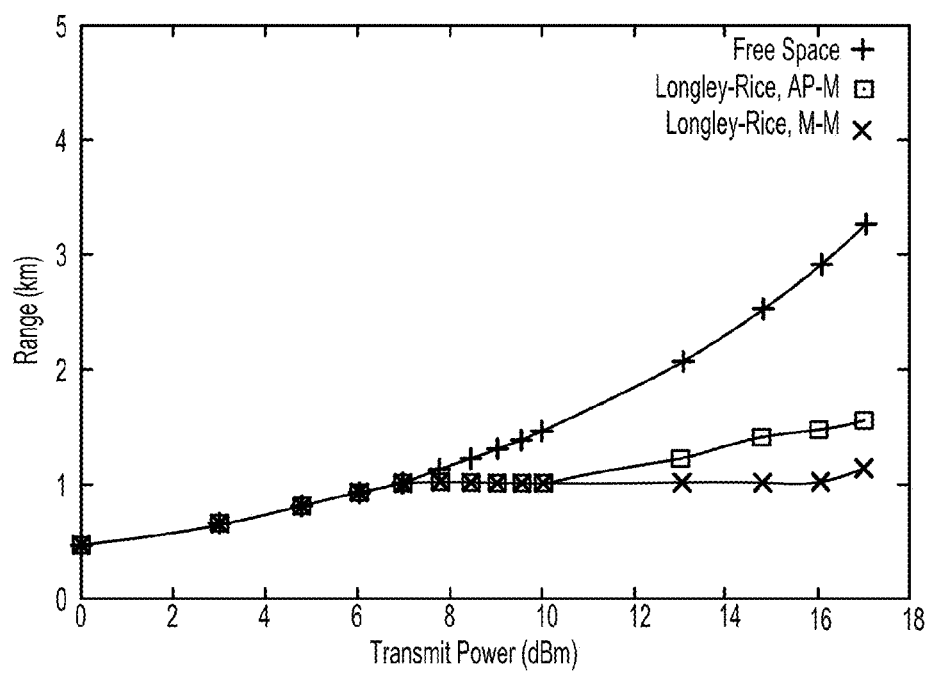

Terrain effects on RF-Mesh Range are illustrated in FIG. 10 which shows the effect of the deployment terrain on an important network performance metric, the transmission range. Two different antenna orientations were considered: a) both the transmitter and the receiver antennas were placed at a height of 2 meters (labeled as M-M as it resembles the meter-to-meter setting) and b) the receiver antenna was kept at 2 meters whereas the transmitter antenna was elevated to 10 meters (labeled as AP-M as it resembles Access Point-to-meter setting). For varying RF-Mesh power levels, it is observed that the terrain characteristics may reduce the effective transmission range as much as 50% compared to free space propagation.

The results indicate that when the receiver is placed at a low height, a communication range of about 1 km is feasible. However, the range extends to about 1.5 km when the receiver is situated at a higher location. These results depend on the terrain profile of the testing area and the effective ranges are expected to vary in other terrain settings. These results suggest that meter-to-meter hops are possible over the range of hundreds of meters and high altitude relays can be used to further extend range in case of coverage gaps.

Figure 11:
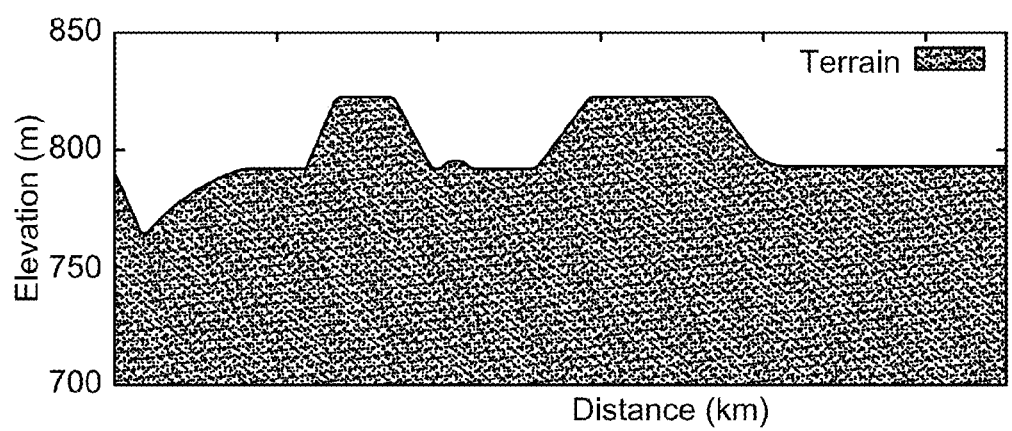
FIG. 11 illustrates a topography related to a network in accordance with an aspect of the present invention.
Figure 12:
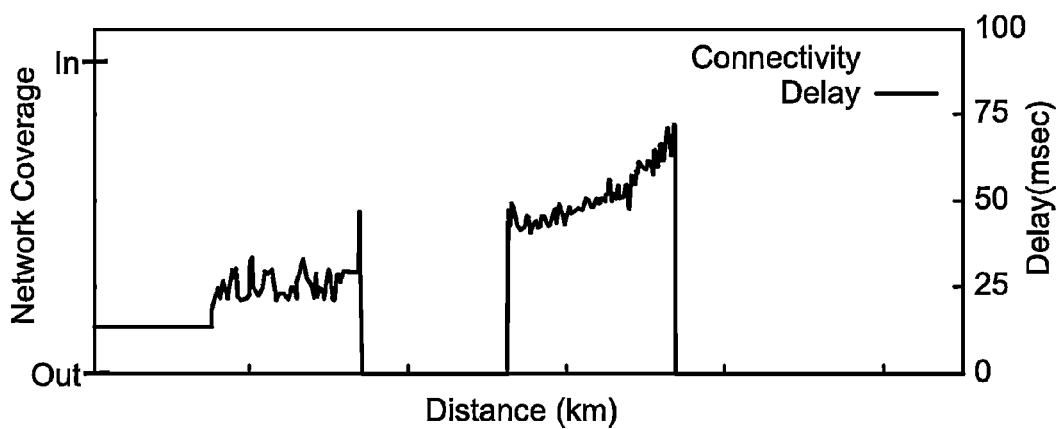
FIGS. 12-15 illustrate a performance of the network in accordance with an aspect of the present invention.
Figure 13:
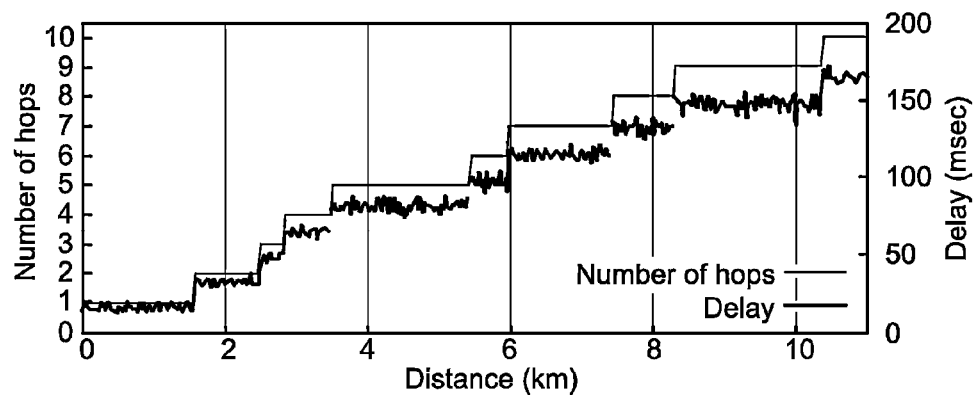
Figure 14:
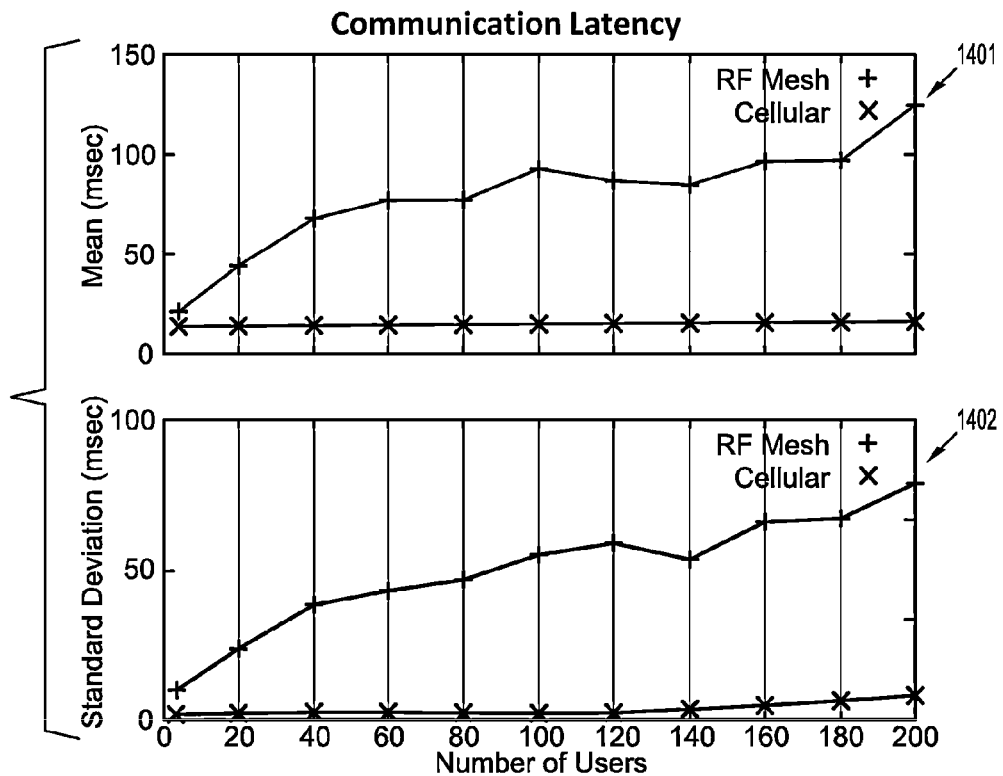

Coverage: For testing coverage areas, a receiver was placed at a fixed location, representing the takeout point. The resulting connectivity of the networks (RF-Mesh and LTE) is observed in a range of 11 km in one direction. In FIG. 11 illustrates the terrain profile of the simulation. FIG. 12 shows the delay and coverage from the LTE network. FIG. 13 shows the delay and number of hops metric from the RF-Mesh setup. FIG. 11 exhibits hills and valleys of about 20 m altitude. Such obstructions cause the mesh network to use short hops at certain locations. Yet, network connectivity is never lost because of the self-healing capability of RF-Mesh. A mesh path can always be constructed between intermediate devices, which utilize adjacent hops to avoid network disconnectivity. FIG. 14 illustrates the delay in an RF mesh as function of the number of users. However, in the case of an LTE network, the transmitter must always have direct connection to the end receiver, so coverage gaps may not be avoided even though LTE links can support longer ranges than single RF-Mesh links.

The terrain characteristics not only have an effect on connectivity, but also on the quality of service. An RF-Mesh experiences increased delay due to the necessity for additional hops; whereas in an LTE network, additional delay might come from bad channel conditions causing retransmissions and other link adaptation mechanisms inherent to LTE networks (i.e. a lowering of the Modulation and Coding Scheme (MCS) index). Note that these results only focus on the coverage in one direction, and the challenges are magnified when a 360 degree view is taken into consideration, since the terrain profile, and accordingly the obtained coverage will vary in each direction.

3) Network Size: FIG. 14 illustrates the effect of the number of users. FIG. 14 illustrates the impact of network size by increasing the number of users that occupy a 4 km distance from the takeout point. By observing the average delay in graph 1401 experienced by all users one can see that RF-Mesh's latency is heavily dependent on the number of users in the network. However, the users in LTE network, with its high bandwidth, experience a less severe effect on their latencies. At the same time, the increase in users cause a less reliable latency guarantee as can be seen in the standard deviation graph 1402. As these results suggest, the network size has to be considered carefully during the planning phase of the network and necessary configuration should be done accordingly to ensure an adequate level of service (e.g. low latency and/or low jitter requirements of the applications should be addressed).

Figure 15:
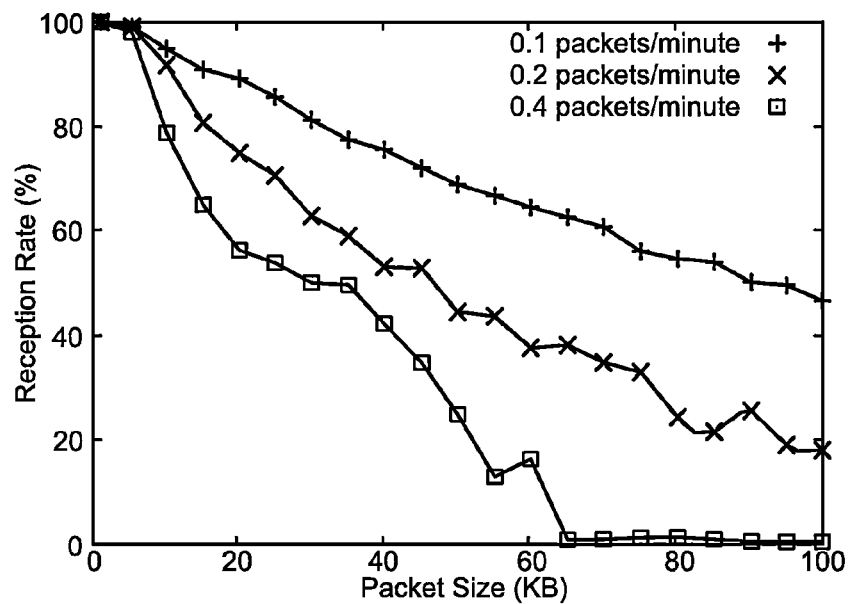

4) Multi-Application. The Smart Grid network is expected to handle multiple applications with diverse requirements (see for instance Table 1 above) concurrently. In one simulation, the focus is on two communication parameters: the transmission packet size and the transmission frequency in order to assess the RF-Mesh network's capability to satisfy different applications. FIG. 15 illustrates that the packet size has a massive effect on the reception rate (the percentage of the packets that is received correctly by the intended receiver) and in case of higher frequency transmissions, the maximum packet size is further reduced. On the other hand, LTE cellular networks exhibit 100% reception rate for the same simulation setup. Hence, the application requirements have a direct effect on the choice of the network technology.

Additional details on applications in a Smart Grid and how these are applied in the simulation provided herein in accordance with various aspects of the present invention will be provided below.

One way to distinguish between the SG applications is by their communication characteristic. This is illustrated in FIG. 16. A first class of SG applications is formed by so called 1 packet applications, which includes AMI traffic and certain aspects of DR traffic. A second class of SG applications is formed by protocol applications, which includes other aspects of DR traffic (including Pull related traffic), EV applications and Feeder Automation applications.

Further details on application characteristics and their requirements with regards to a communication network are illustrated in FIG. 17.

Figure 18:
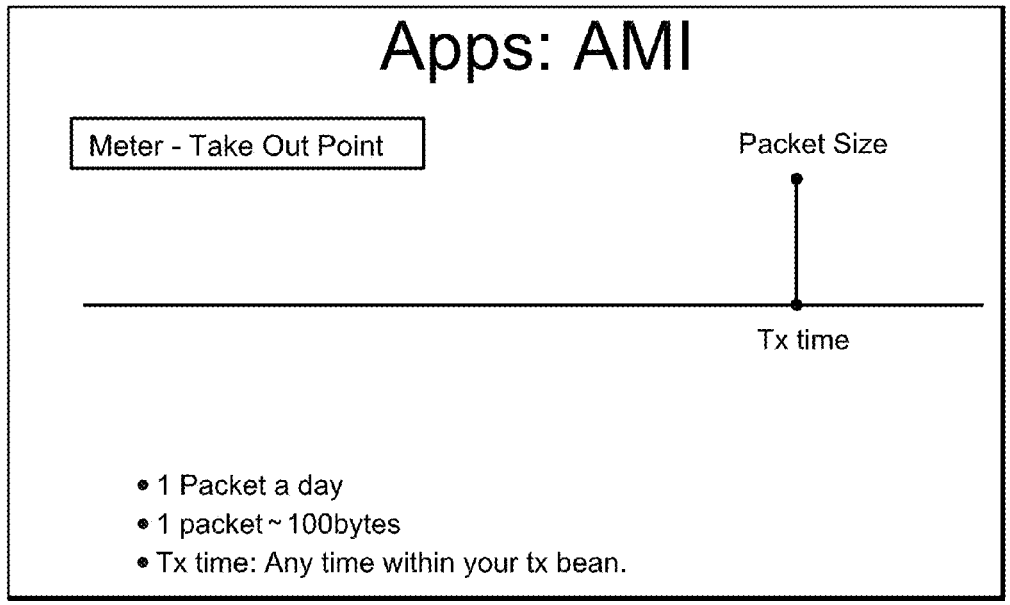
FIGS. 18-36 illustrate packet and message transfer provided in accordance with one or more aspects of the present invention.
Figure 19:
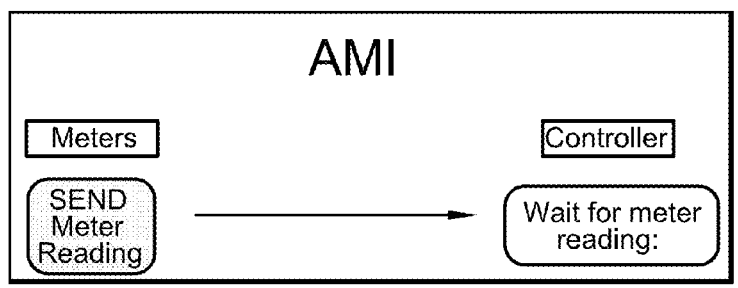

Further transmission behavior of AMI as a one packet application is illustrated in FIG. 18 and the message flow is illustrated in FIG. 19.

Figure 20:
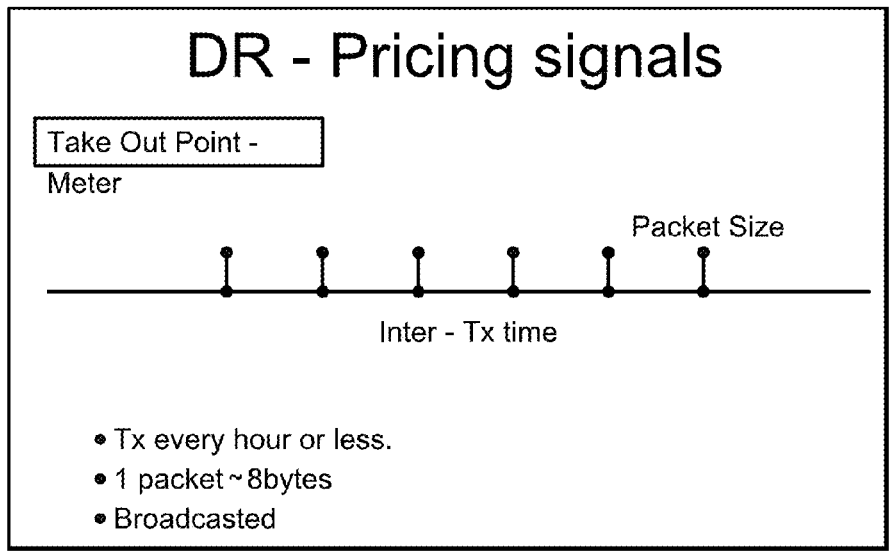
Figure 21:
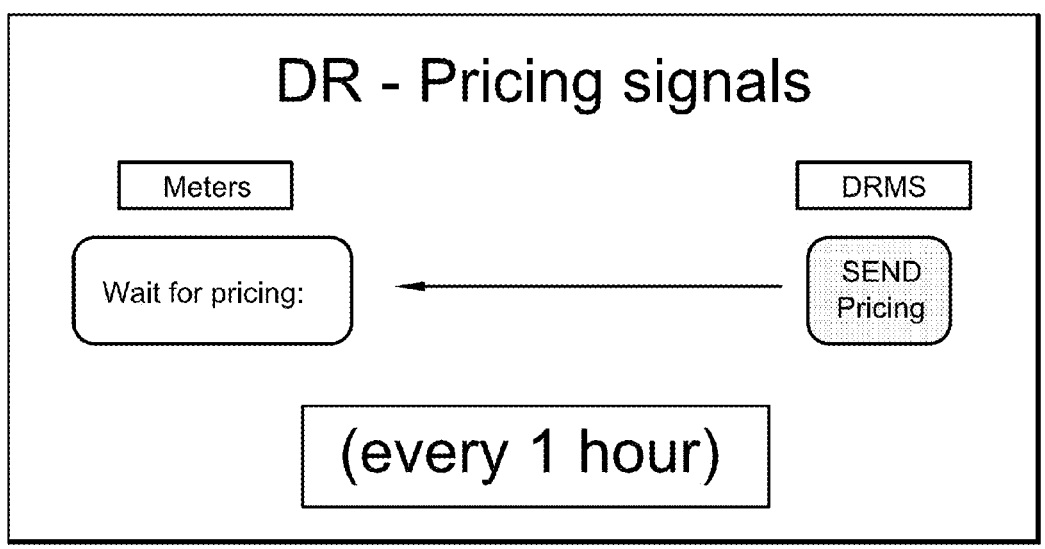

Transmission of DR pricing as a one packet application is illustrated in FIG. 20 and the message flow is illustrated in FIG. 21.

Figure 22:
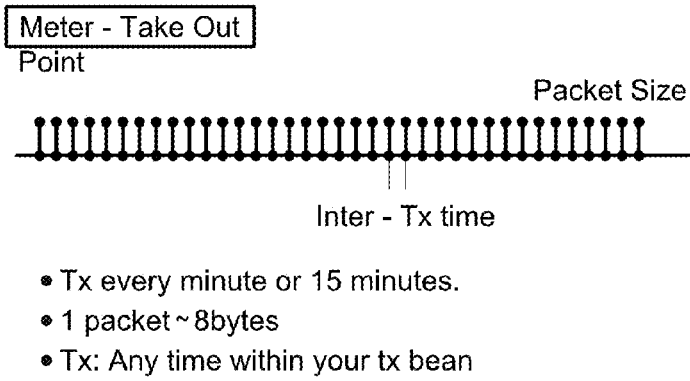
Figure 23:
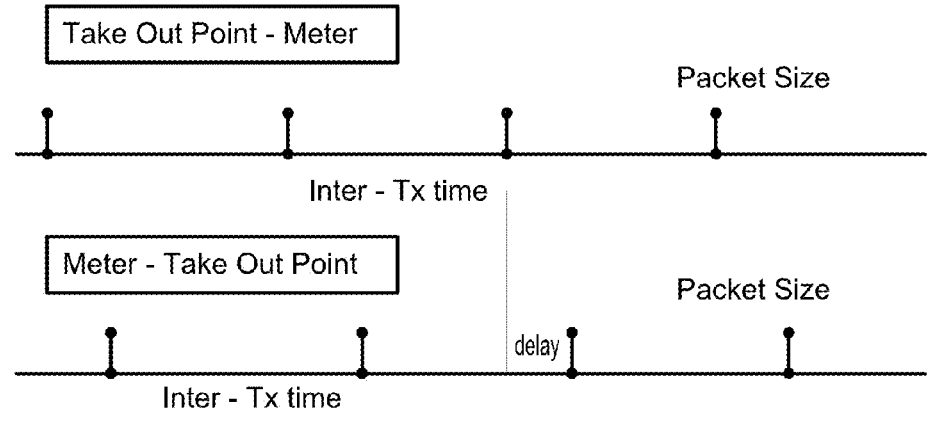
Figure 24:
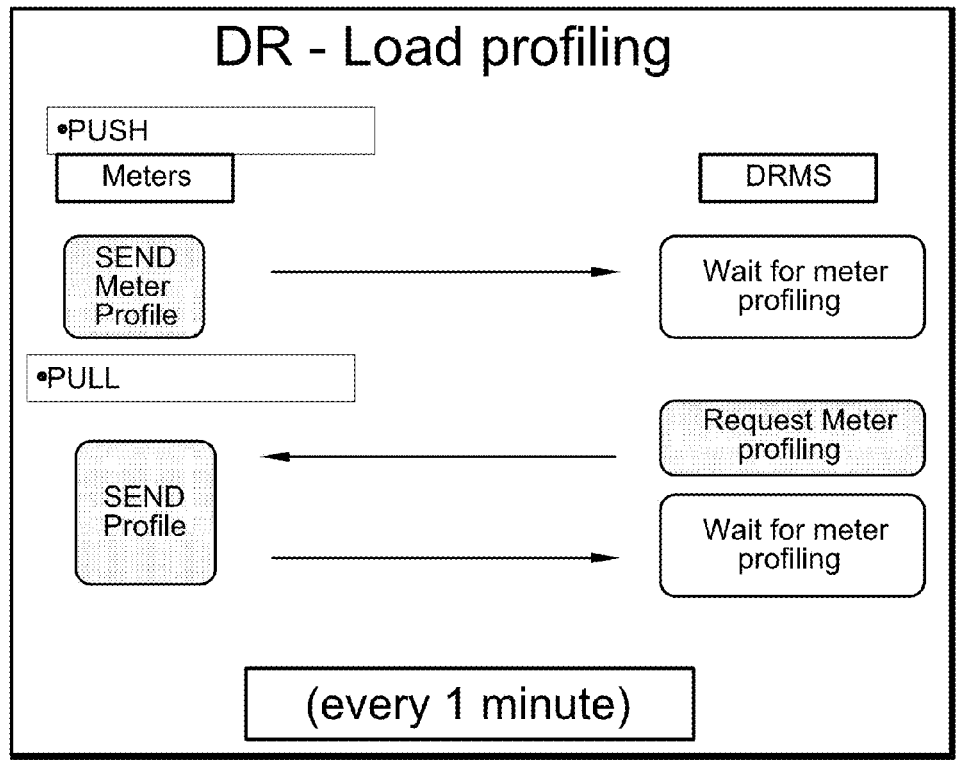

Packet flow in DR Load profiling (Push) is illustrated in FIG. 22. FIG. 23 illustrates Load profiling (Pull). FIG. 24 illustrates DR Load profiling (Push and Pull) showing the difference between the one packet (or one step) application of the Push side vs. the Protocol (or interactive) aspect of the Pull side of DR Load profiling.

Figure 25:
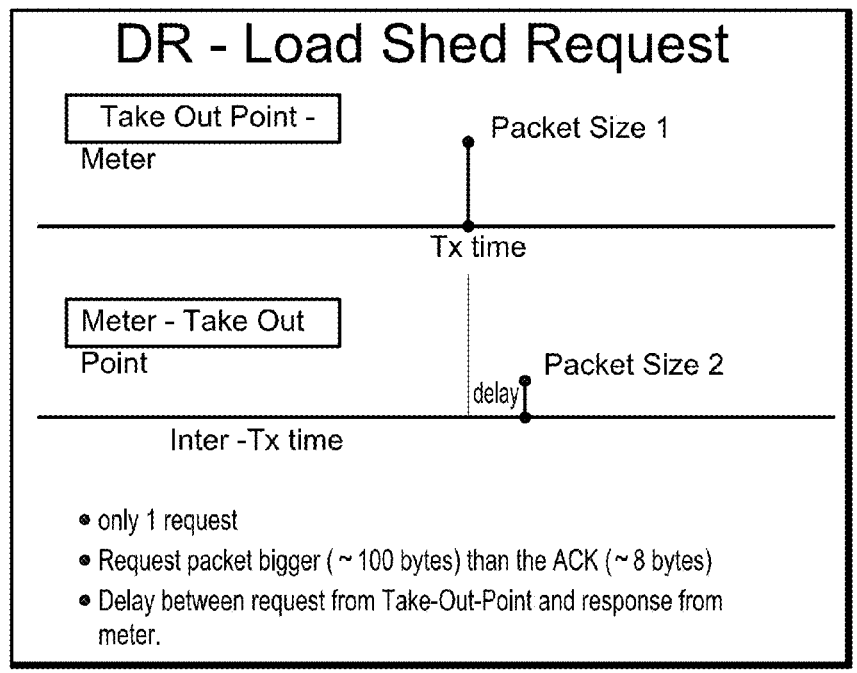
Figure 26:
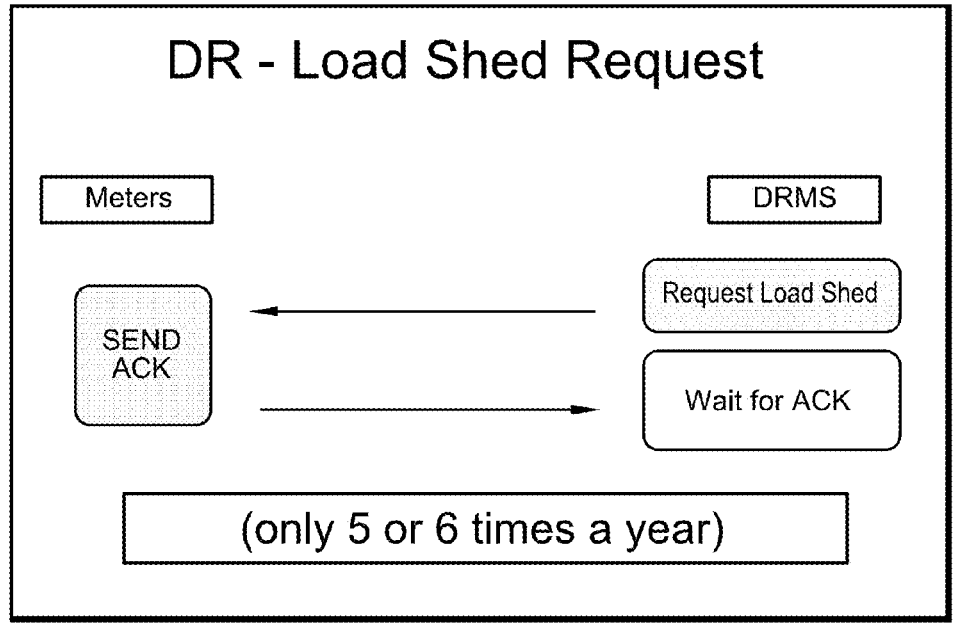

Packet flow in DR Load shed request is illustrated in FIG. 25 and FIG. 26 illustrates the message flow in this application.

Figure 27:
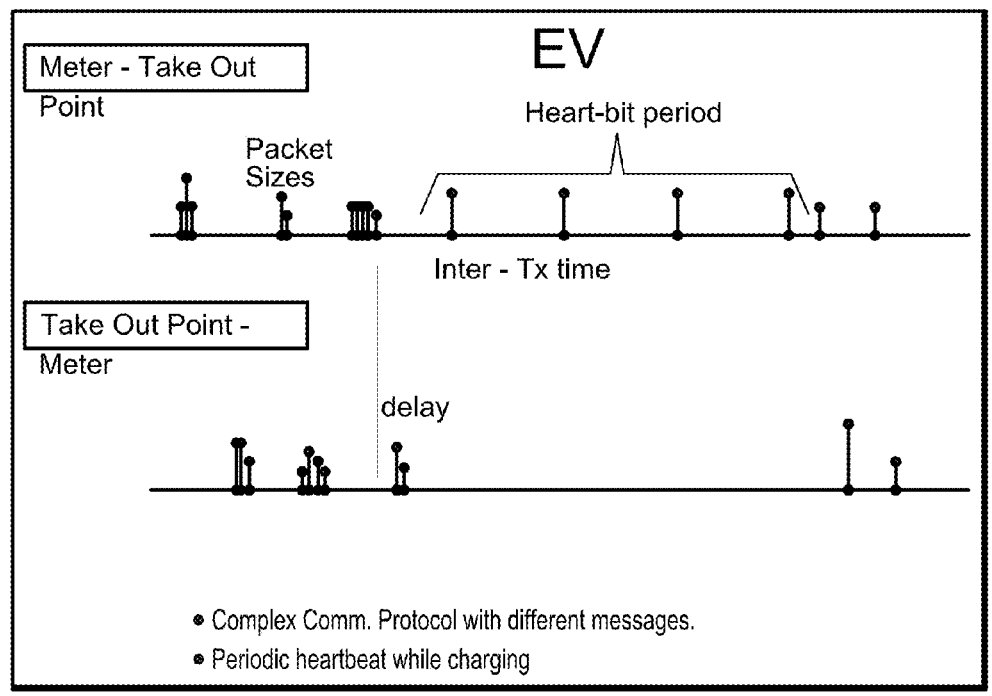
Figure 28:
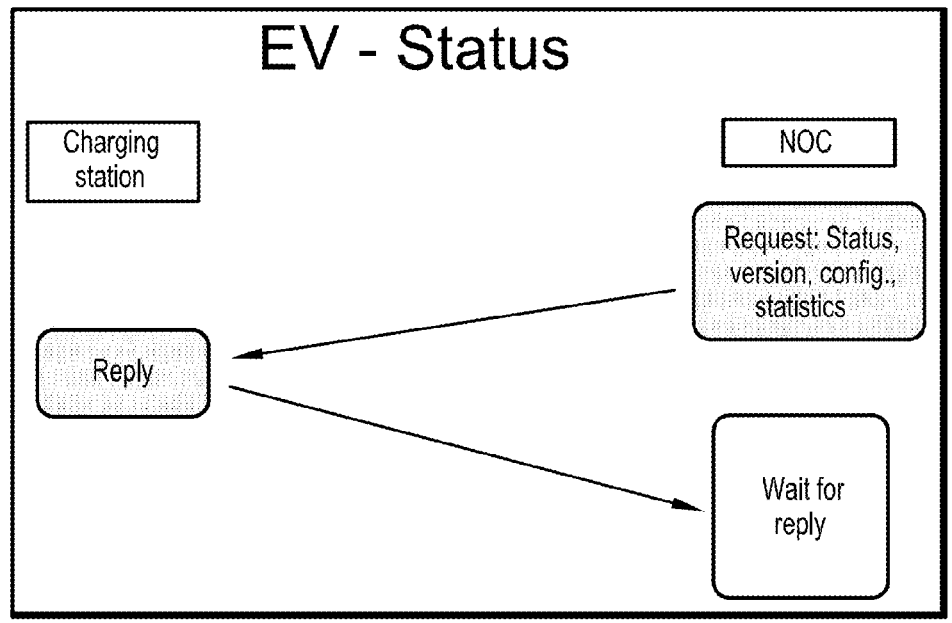
Figure 29:
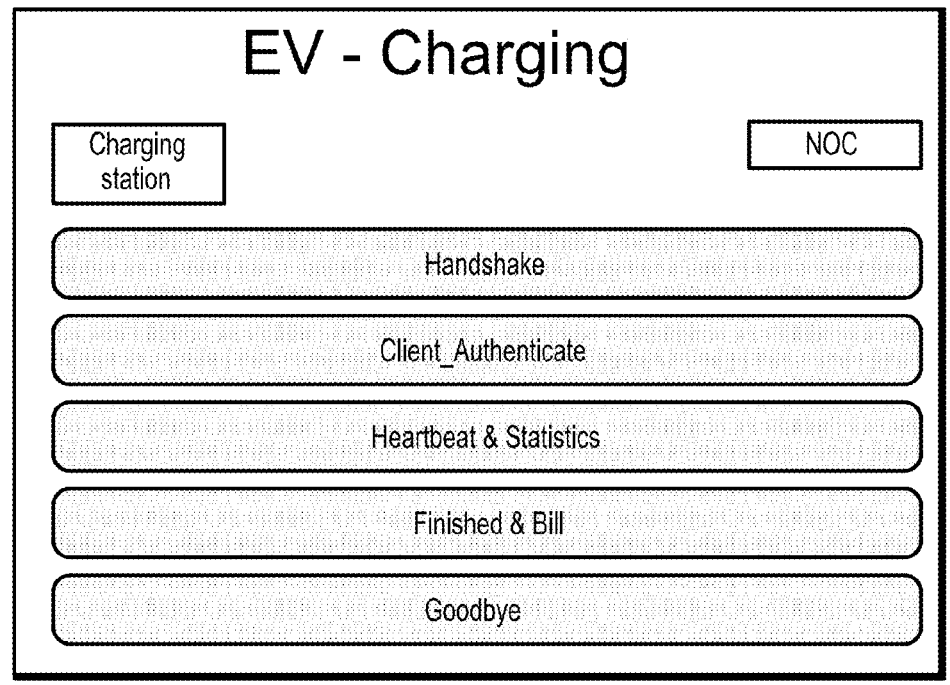
Figure 30:
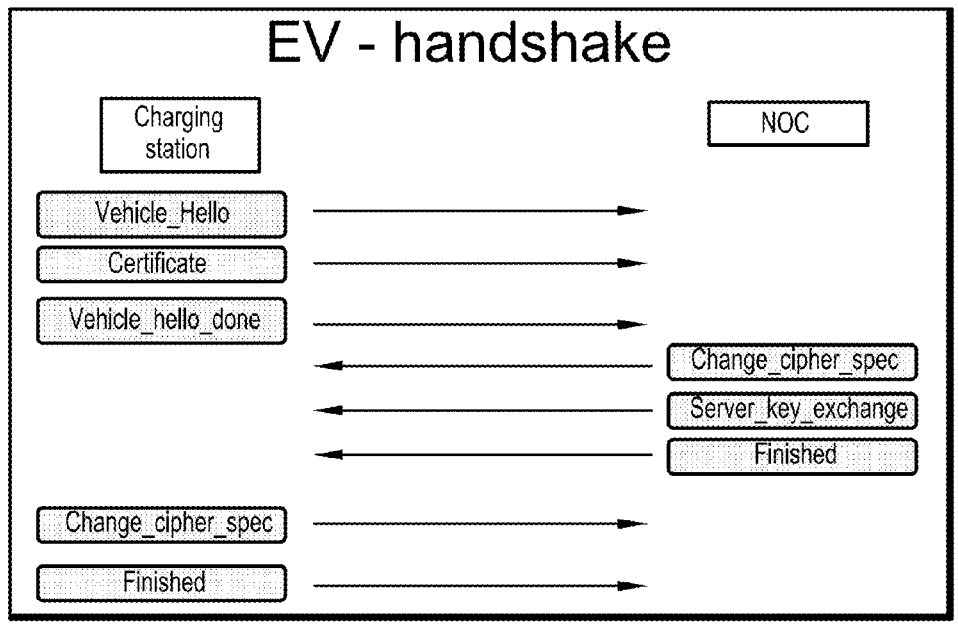
Figure 31:
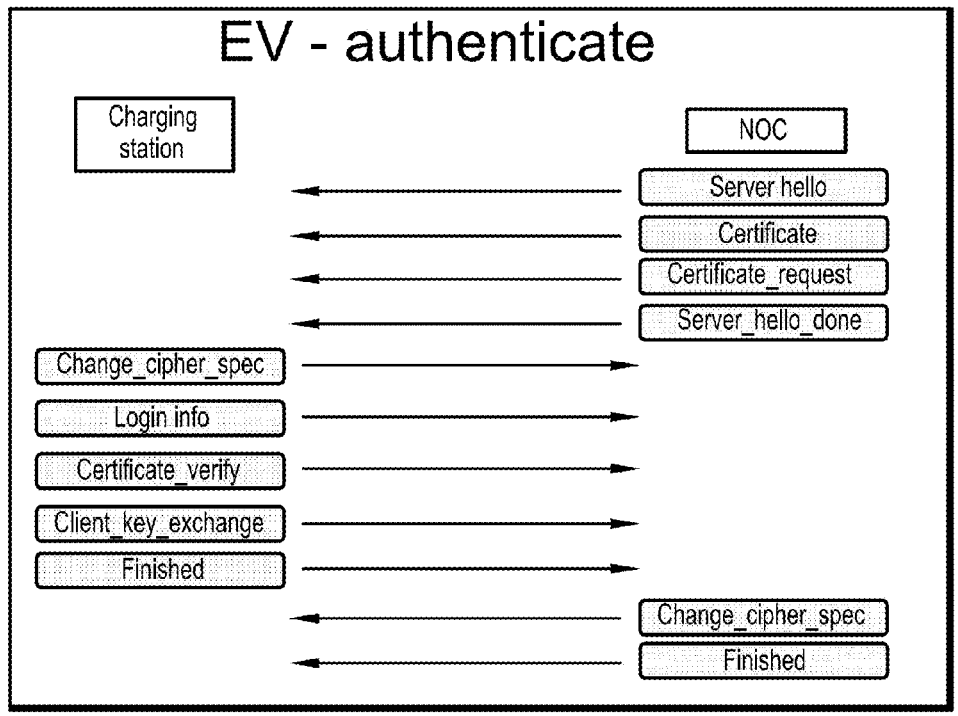
Figure 32:
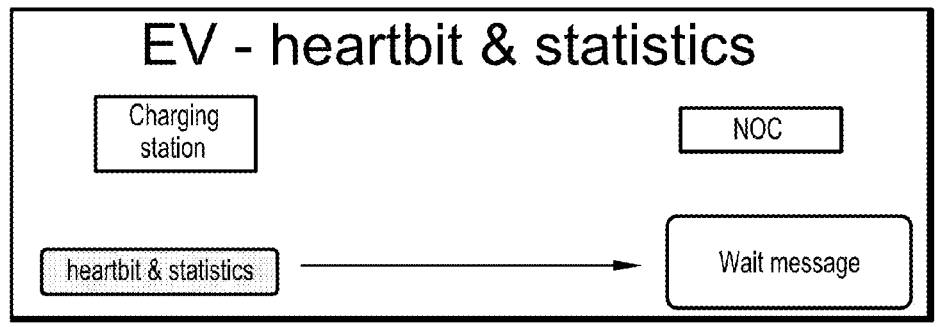
Figure 33:
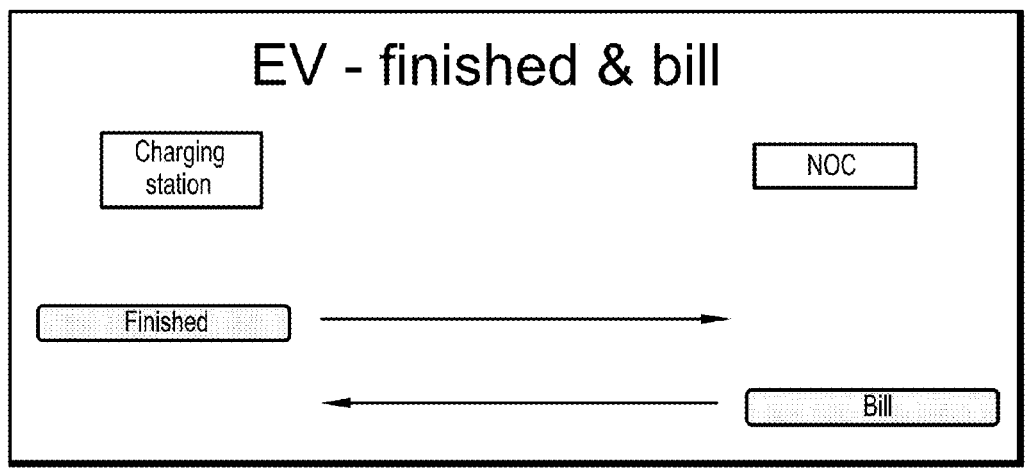
Figure 34:
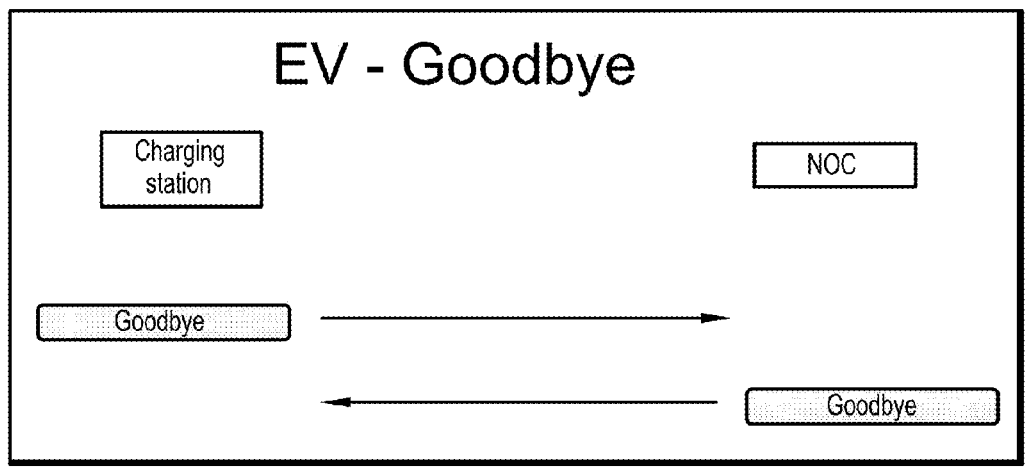

FIG. 27 illustrates a packet flow in EV charging. The protocol for EV is actually fairly involved and its message flow is illustrated in FIGS. 28-34.

Figure 35:
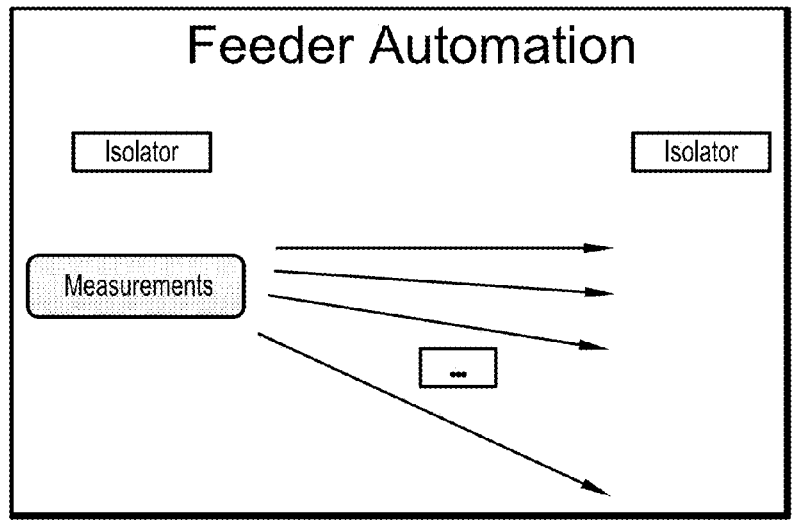

FIG. 35 illustrates Feeder Automation.

Figure 36:
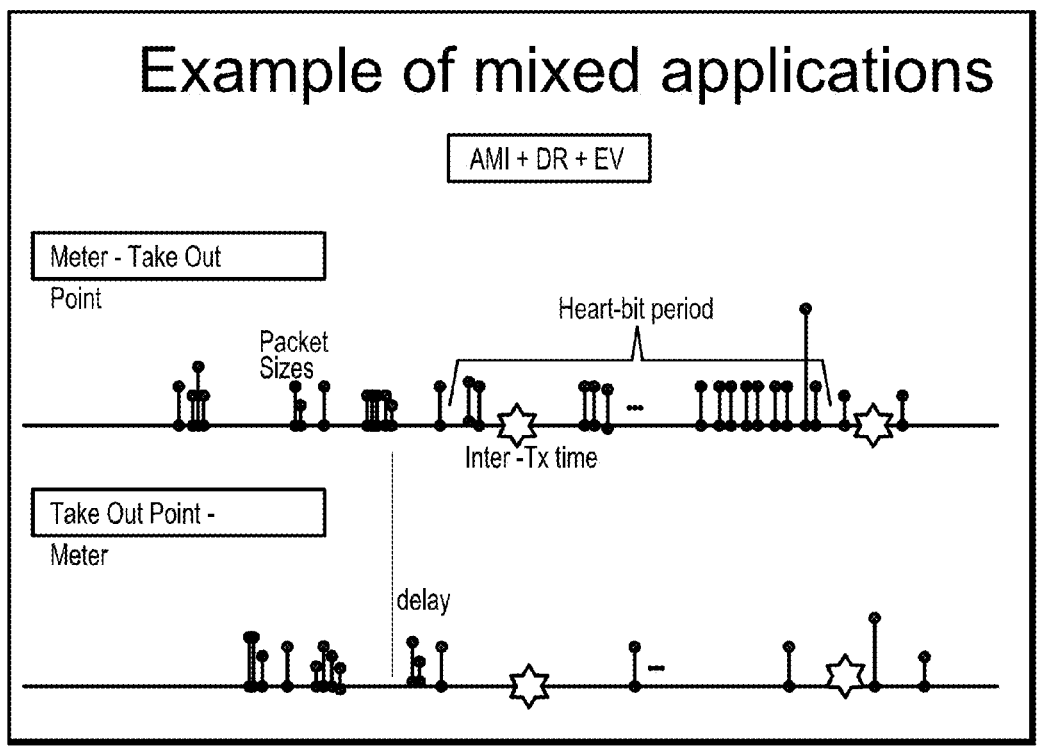

FIG. 36 illustrates an example of mixed applications (AMI+DR+EV) illustrating the need to dimension the SG network for a mix of different application and expected traffic.

Figure 37:
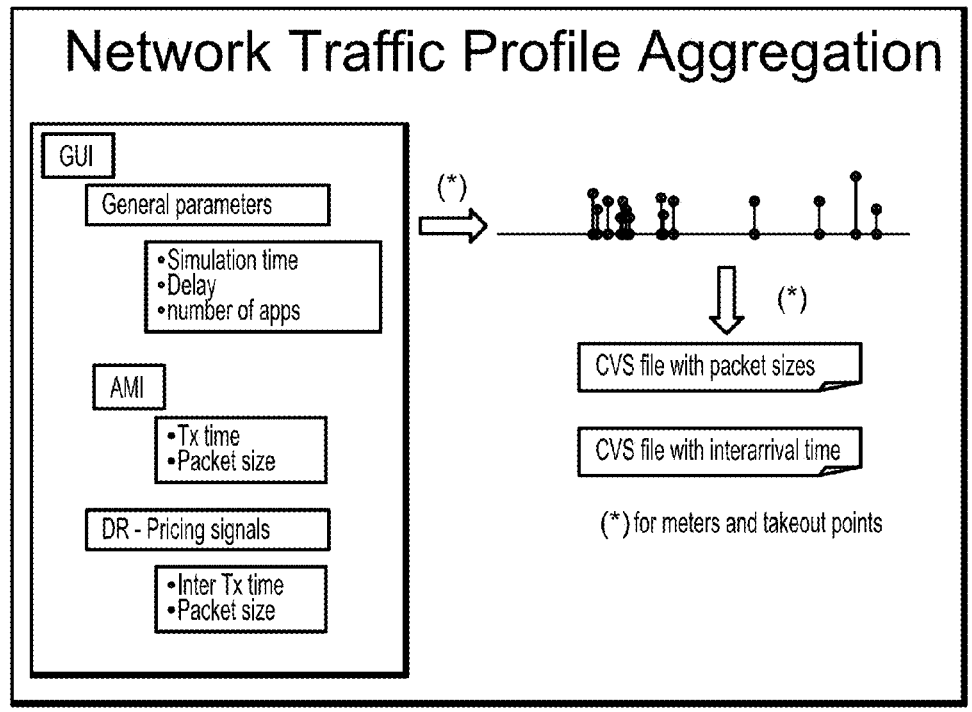
FIG. 37 illustrates network traffic data representation in accordance with an aspect of the present invention.

FIG. 37 illustrates one aspect of entering data into the SG-CAT. Data (parameters related to applications) are entered into the computer by for instance a GUI, though parameter entry through a configuration file is also possible and contemplated. The resulting packets are generated by the Smart Grid Communications Assessment Tool (SG-CAT) and are for instance represented by comma separated values (CVS) files.

Figure 38:
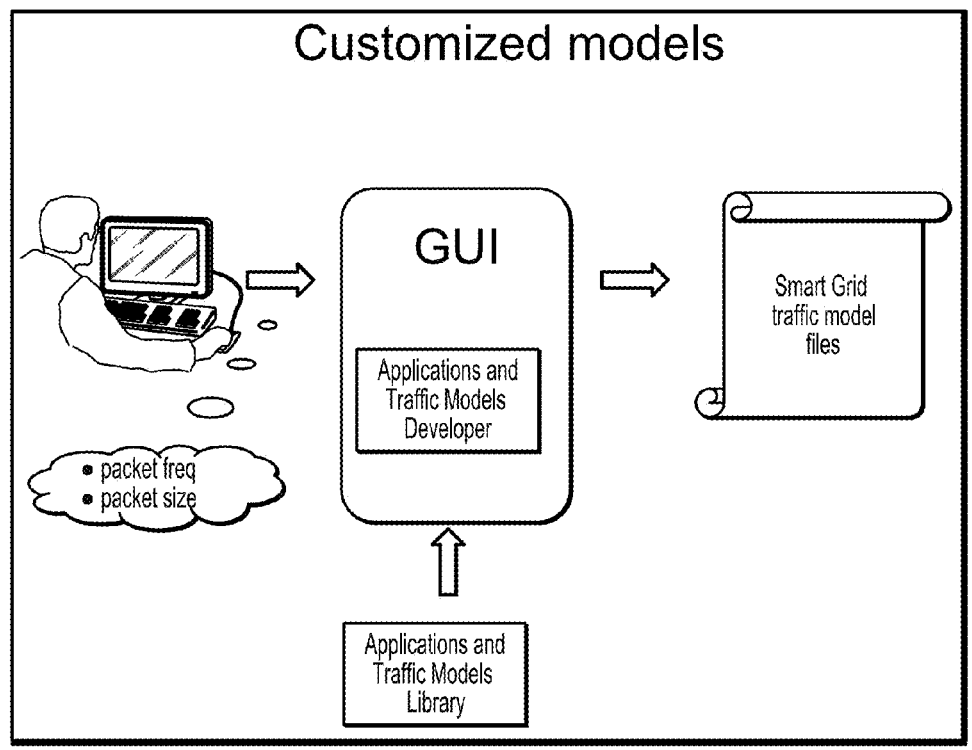
FIGS. 38-39 illustrate various aspects of customized models as provided in accordance with one or more aspects of the present invention.

One can thus create customized models generated by SG-CAT to test assumptions and conditions related to specific SG configurations, as is illustrated in FIG. 38.

Accordingly, realistic, dynamic and configurable traffic models are provided that emulate or significantly approximates the real behavior of different Smart Grid applications by applying a definition of realistic protocol and transmission models for SG applications and by applying a computer system tools that convert the protocol and transmission models into traffic templates. As a further aspect of the present invention a template is provided for certain common applications, features or aspects of a SG communication network that can easily be adapted to specific local requirements or conditions. A user thus can select a template for a certain environment (rather than defining a configuration completely from scratch) and customize it for local conditions, such as topology or number of users and/or traffic requirements and the like.

Figure 39:
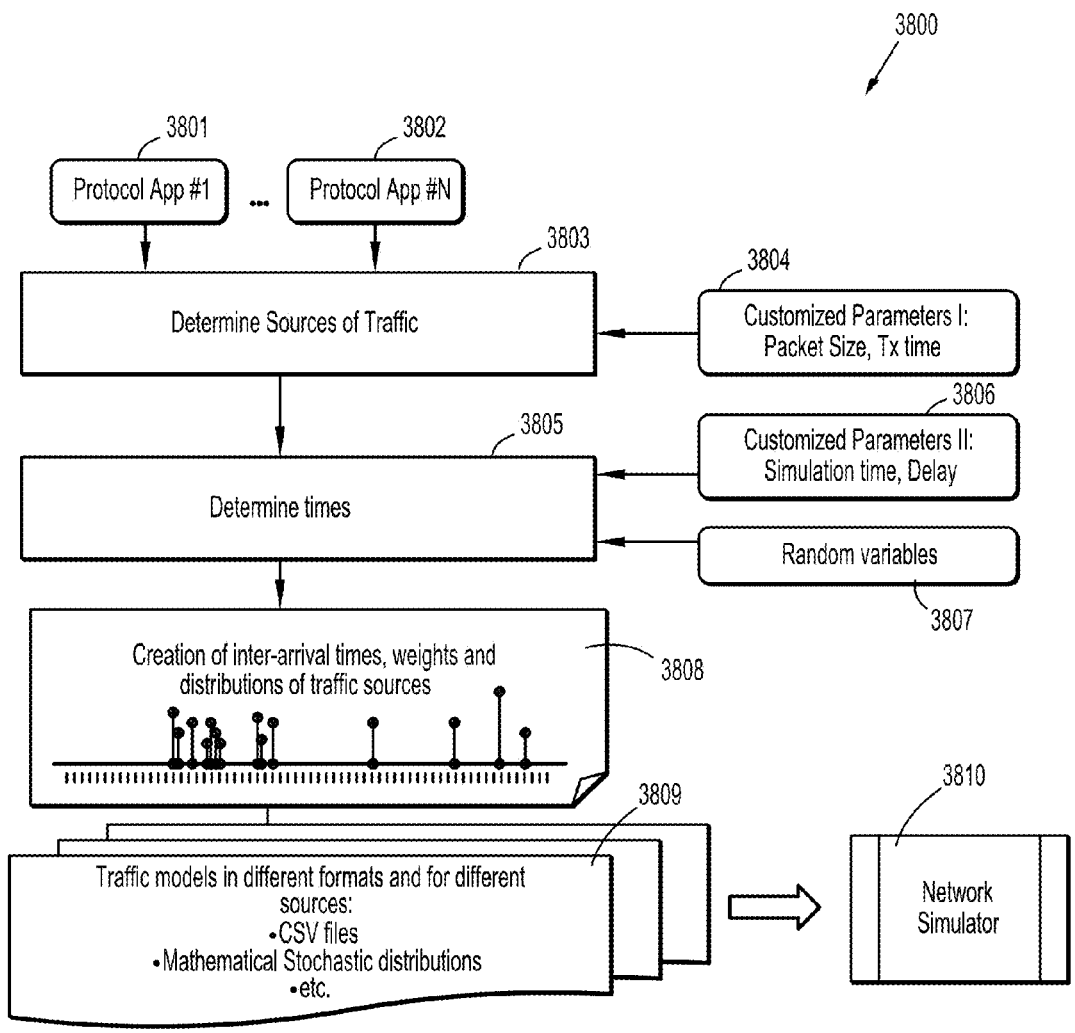

FIG. 39 provides an overview of several steps in setting up the simulation. A series of transmission protocols for applications, including single packet rules, indicated by 3801 and 3802 are implemented on a computer. In step 3803 the sources of traffic are identified, wherein parameters of a source (including packet size and transmission time) are entered in step 3804. The times are processed in step 3805 after times parameters (such as delays and simulation time) are provided in step 3806 and random variables are entered in 3807. The random variables indicate the likelihood of a certain event to happen for instance. In step 3808 inter-arrival times, weights and distribution of traffic sources are generated and the related traffic models are provided for instance in file format to a network simulator 3810.

How a study related to SG-CAT is conducted is described in the following.

Figure 40:
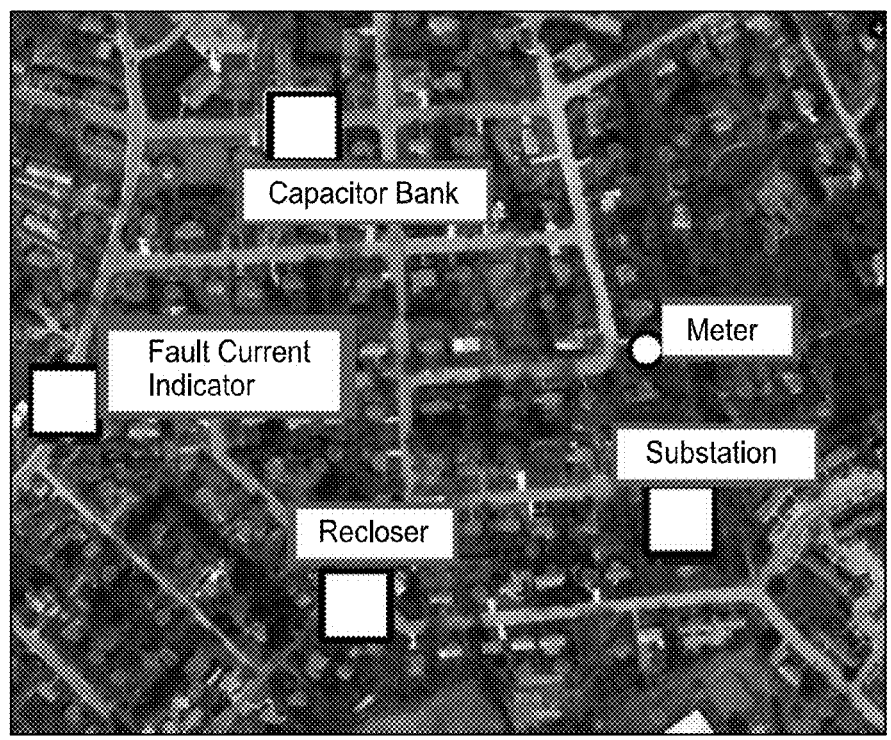
FIG. 40 illustrates a geography with assets in a electric grid in accordance with an aspect of the present invention.

A study may begin with SG-CAT automatically importing the topology of all devices (such as cap banks, meters, reclosers, FCIs, voltage regulators, substation RTUs, distribution transformers, line sensors, protection relays, etc.) within the utility's service area, along with terrain and elevation data. This is illustrated in FIG. 40 wherein a map or an aerial picture is used to position or locate equipment for the simulation.

Figure 41:
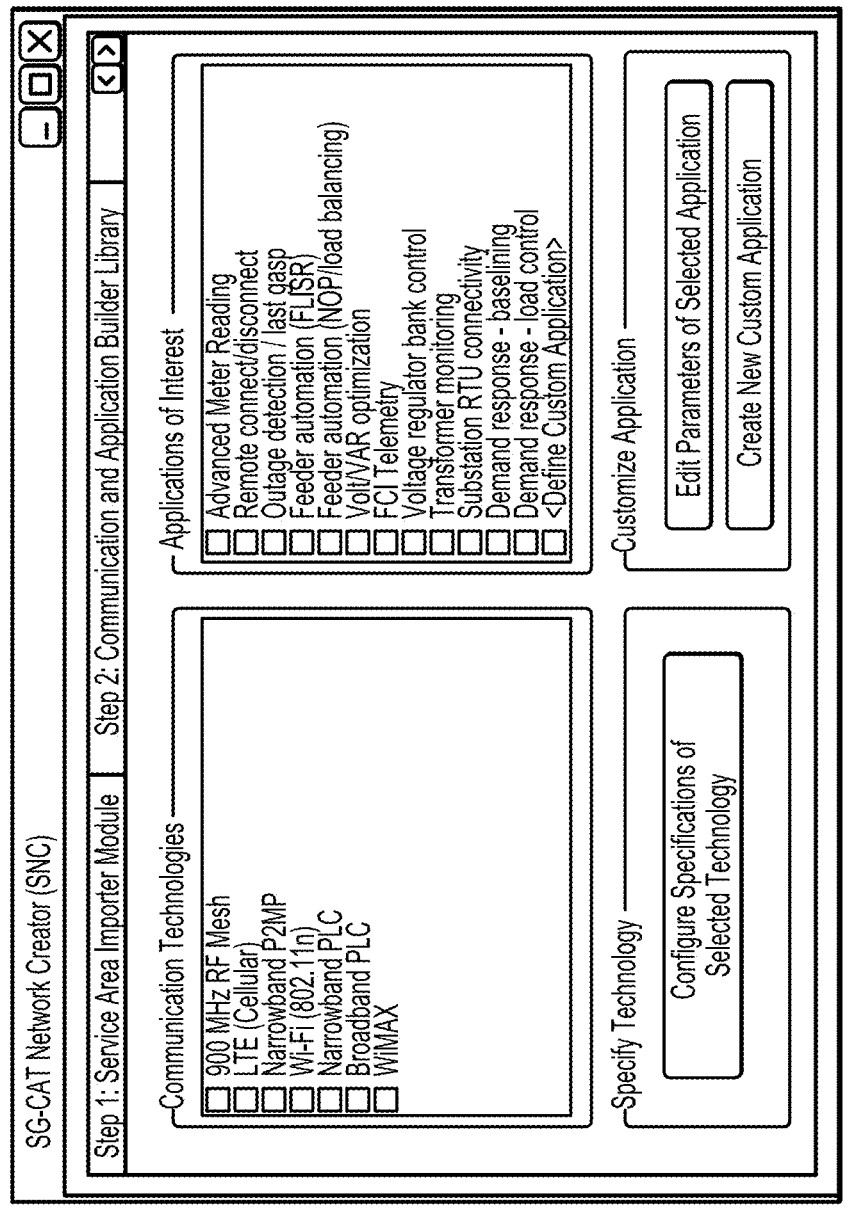
FIG. 41 illustrates an interactive display provided in accordance with an aspect of the present invention.

After importing terrain and asset information, SG-CAT simulates deployment of the most popular Smart Grid applications a atrons technologies for each device in the utility's service area. A user can configure the tool based on desired communications specifications (power levels, frequencies, modulations, etc.) for instance via an input screen as illustrated in FIG. 41.

Figure 42:
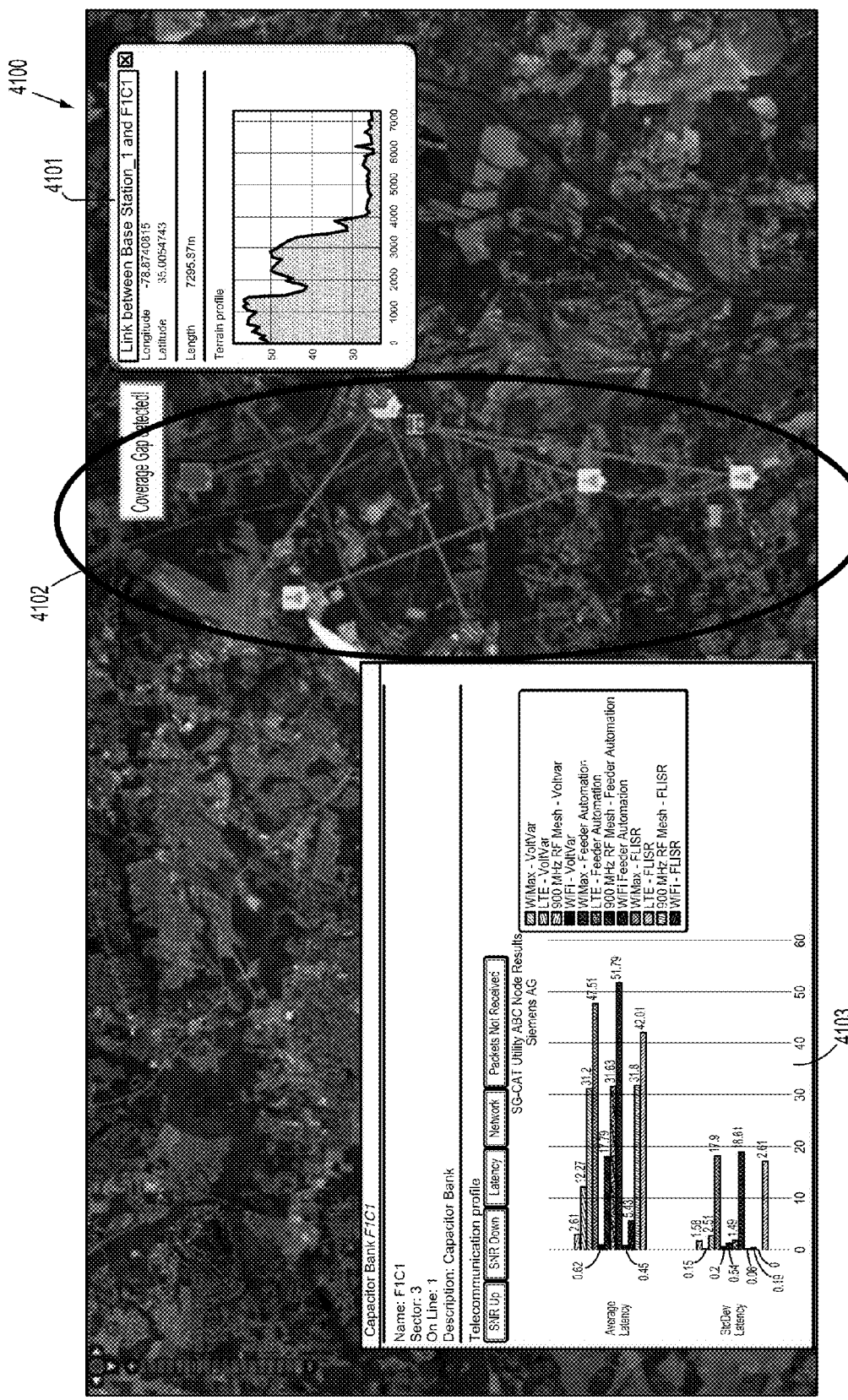
FIGS. 42-46 illustrate display screens generated by a system in accordance with various aspects of the present invention.
Figure 43:
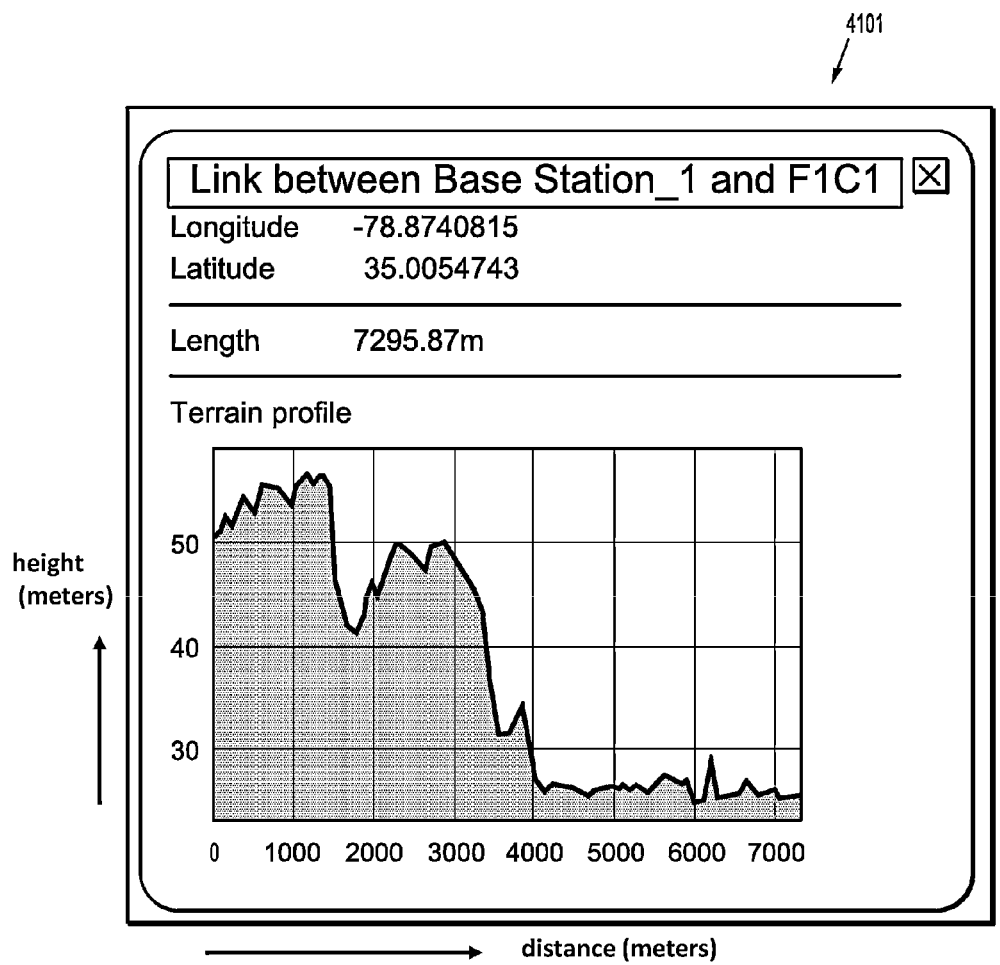

Individual statistics, such as latency, packet loss and Signal-to-Noise Ratio (SNR), from every device are collected and can be easily viewed for every combination of communication technology and Smart Grid application included in the study. For instance details about delays are shown in 4103 which is provided enlarged in FIG. 45. As one result a map with identified resources and issues is generated, as illustrated in FIG. 42. FIG. 42 provides a high level overview what can be generated. Detail 4101 is an overview of topology or terrain profile of a link between two assets of which the details are better visible in FIG. 43. Both FIGS. 41 and 43 display terrain profile in meters as a function of distance in meters.

Figure 44:
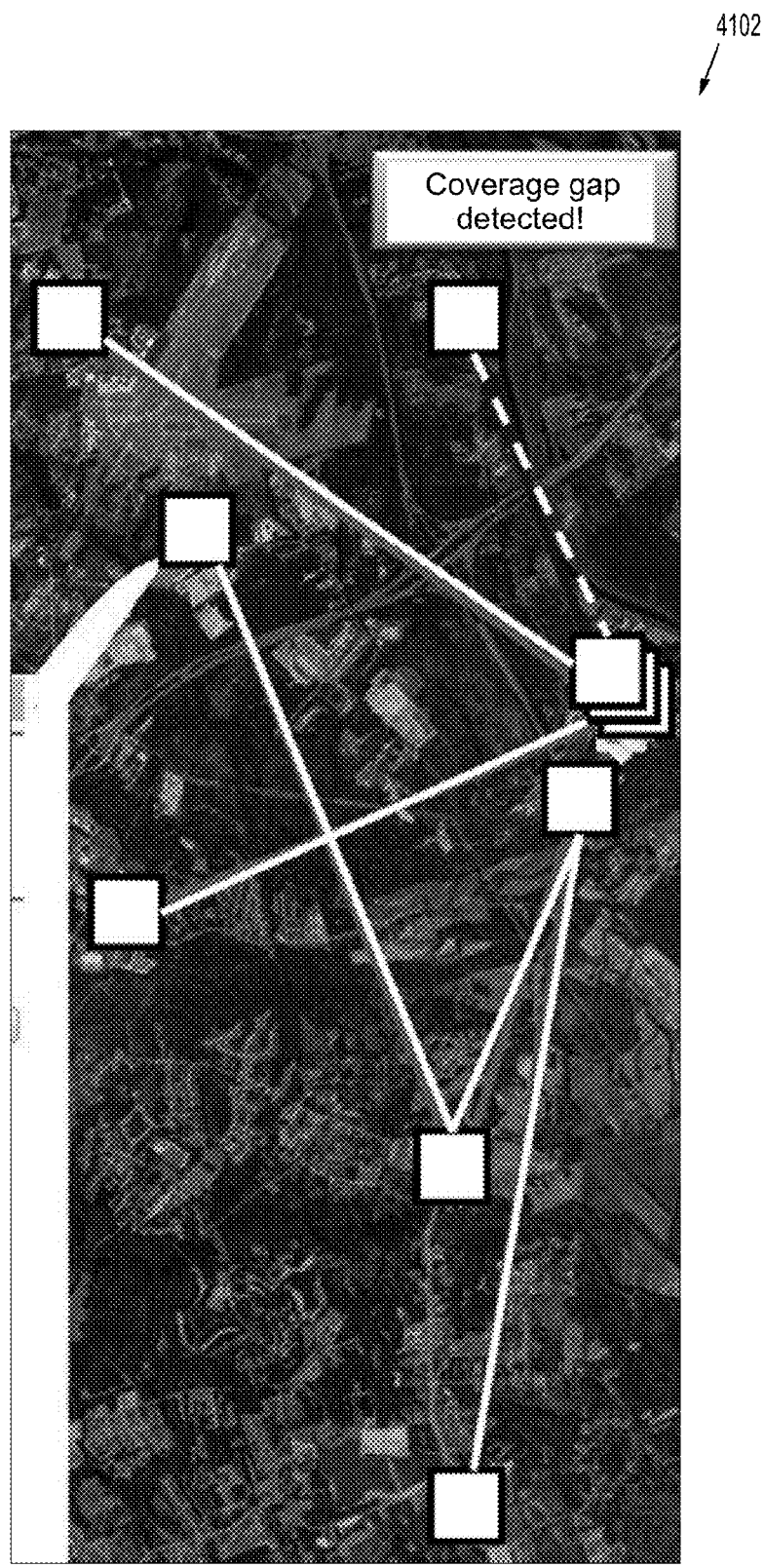

Additionally, SG-CAT provides visualization of all communications links between devices in the service area as identified in 4102 also provided in FIG. 44, including link specific details, ouch as the terrain profile along the link 4101. Among other things, this allows automatic detection of connectivity issues.

Figure 45:
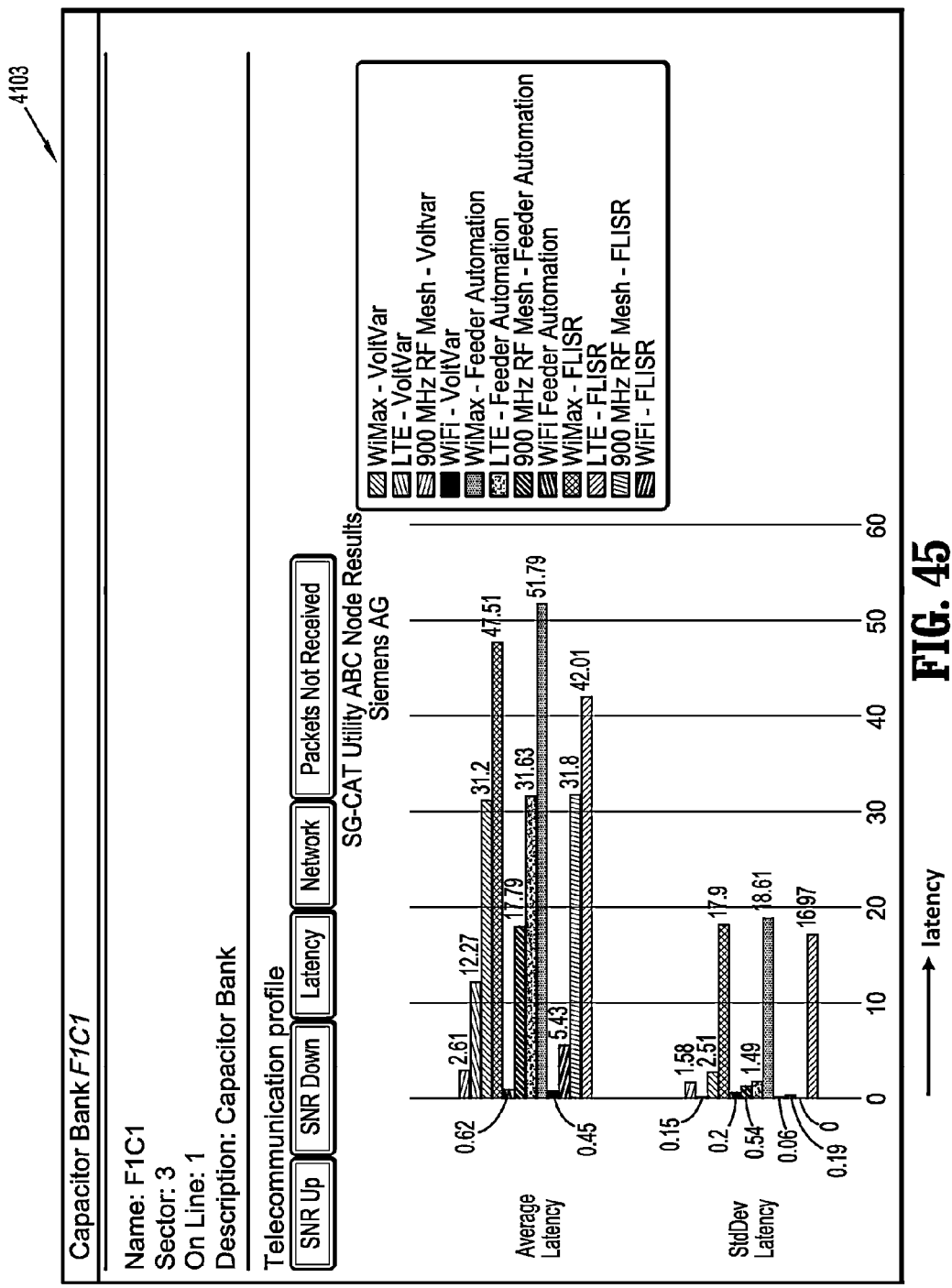
Figure 46:
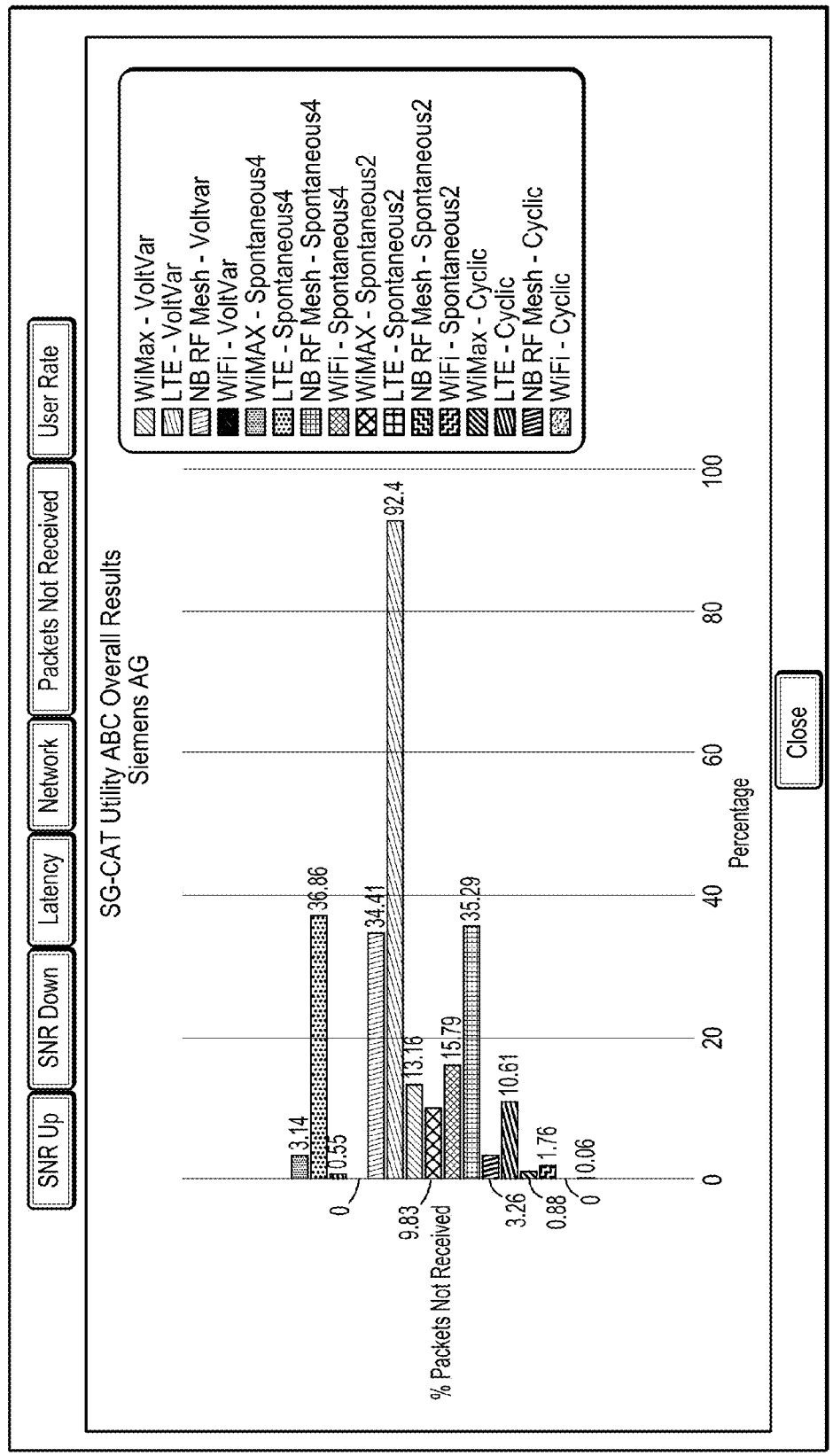
Figure 47:
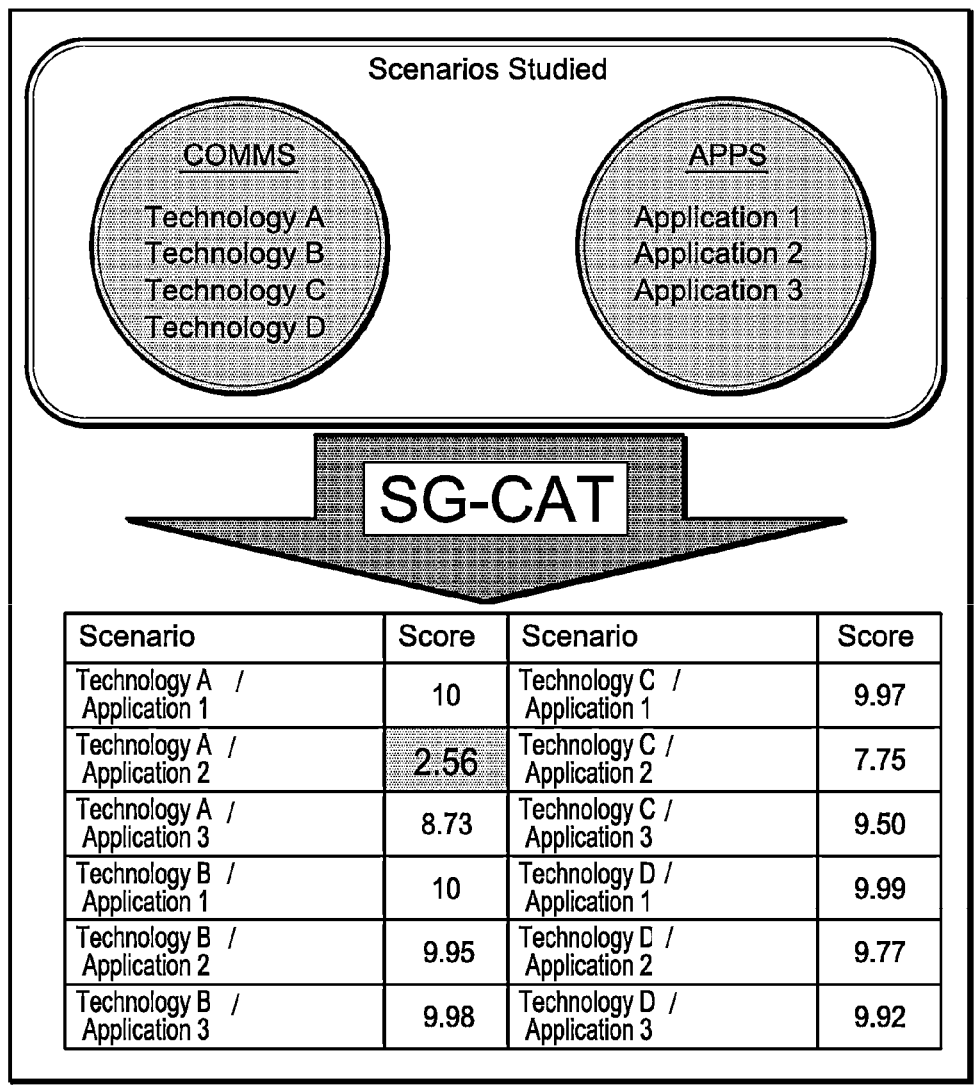
FIG. 47 illustrates a network performance scoring in accordance with one or more aspects of the present invention.

As a result of a simulation the expected differences between various approaches can be visualized as illustrated in 4103 in FIG. 45, here in term of lost packets for a capacitor bank and in FIG. 46 for overall results. One can generate different scenarios for instance with different mixes of technology and applications and provide a rating or score for each scenario based on performance such as lost packets as illustrated in FIG. 47.

The scoring formulas take raw statistics relevant to the application of study such as latency or reception rate and convert them to a score index that indicates how successful the technology was in implementing the application based on the application output requirements. In one embodiment of the present invention, the score is directly determined by the percentage of packets that is correctly received. For instance a correct reception rate of 87.3% will be scored as 8.73 on a scale from 0 to 10. Other scoring methods are possible and are fully contemplated. For instance, one may provide each application with a unique scoring formula particular to their output requirements.

Co-simulation

The new grid will require automatic fault detection, voltage optimization, load management, continuity sensing, phase management and a host of other new techniques to manage the much more complex power generation system and energy network of the future. All these functions will overlay on communication infrastructure.

Advance large scale power grid modeling and simulation with connections to other critical infrastructure such as communication, transportation, oil and natural gas, water. Power grid models subsume load flow, stability, circuit problems, congestion, voltage stability, dynamic stability. They are distributed in nature, and use communication as enabling technology. Accordingly, the expected operations of the grid have to be supported by the communications network and the design of the grid will influence the configuration of the communications network.

Figure 48:
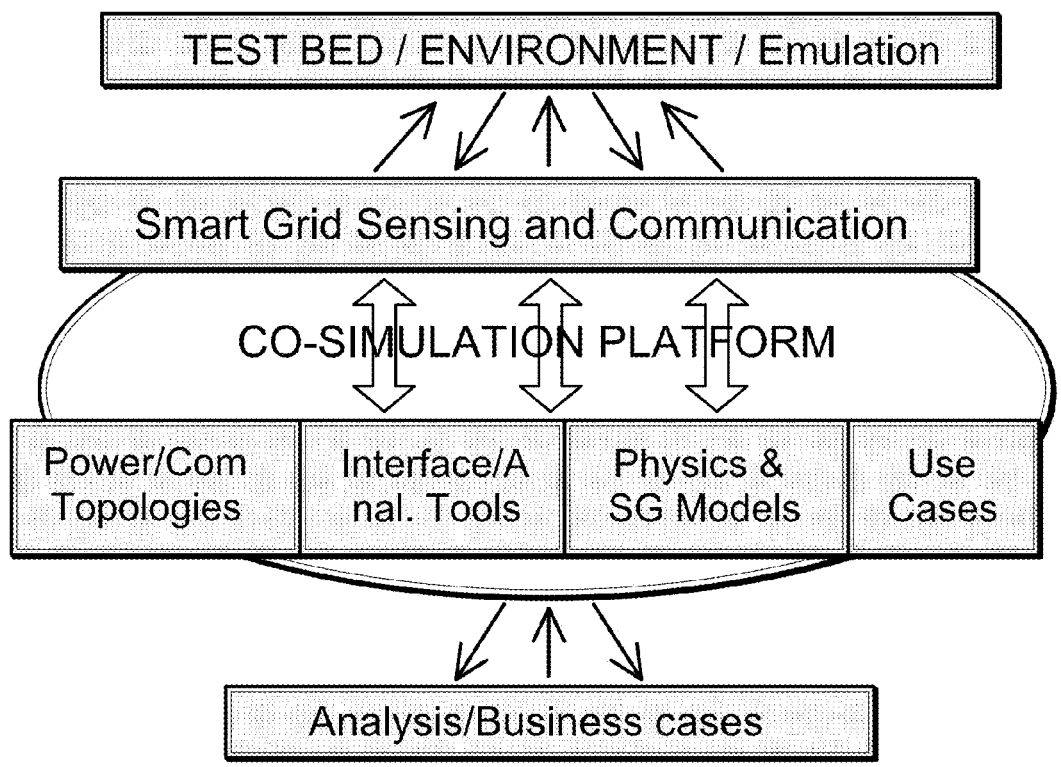
FIG. 48 illustrates a co-simulation platform in accordance with an aspect of the present invention.

So, in addition to a realistic network simulation of smart grid communications networks, an integration with simulations of dynamics in power flows, control, data management of utility/power networks with communications is provided as an aspect of the present invention. Such a co-simulation platform is illustrated in FIG. 48. A selected configuration for a new power grid and its automated control and management will generate the required communication configurations which can be tested under different power grid as well as communication constraints.

The following steps for the co-simulation method in accordance with one or more aspects of the present invention are provided next:

Assess/design the communication network for a given requirement set of an electrical system.

Examples: given an electrical system, communication points (electrical components requiring inbound/outbound communication traffic) and traffic patterns, perform the following:

a. Network Planner: Design the network topology, i.e. what kind of system is needed? If mesh, where are the optimal locations for access points with wired backbone access? What should be the frequency/channel selections? etc. This function as a planning tool to assist the engineers in designing their communication infrastructure for a given electrical system.

b. Next Generation Smart Grid Protocols and Algorithms: Design new algorithms/protocols which address the unique problems associated with the traffic generation characteristics of the electrical system. An electrical system, at first sight, resembles a very large sensor/control network since the majority of the electrical components are overseen to be deployed with some kind of a sensor which reports about the condition of the component, near future needs, capabilities, as well as control mechanisms that are set in response to sensor inputs. In such cases, the traffic generation rate per source is rather small, however, the challenge lies in handling this traffic in extremely large systems (i.e. the number of nodes producing the traffic is quite large). New protocols/algorithms can be designed and tested in a co-simulation environment in order to tackle these unique problems.

One such example is In-Network Data Aggregation. Instead of transmitting all the traffic coming from all the electrical components, the network can be smart enough to pre-process and aggregate the traffic as it is flowing through a network route. With a co-simulation environment, one can design and implement the new communication protocols/algorithms that solve the unique challenges in SG and simulate them realistically.

How problems that occur in the communication network will affect the overall functionality of the electrical network as any errors/disruptions occurring on the communication link will disable the electrical network components to communicate with each other. In order to measure/assess the level of these disruptions, perform the following:

a. Worst-case Scenario Simulations: The disruptions of the communication network can be introduced in a co-simulation in order to see the subsequent effects of these disruptions on the electrical network. For instance, if the communication between two communication nodes is lost for 1 hour and if the traffic flowing through these nodes is lost for that period, what happens to the electrical network? What is the cost of this disruption from the electrical systems' side? Does it cause the electrical system to dysfunction or is it a minor glitch?

b. Self-healing Wireless Networks: Self-healing capabilities of the communication network can be analyzed and new procedures for timely and efficient wireless restructuring mechanisms can be provided. In case of any disruptions (as above), a proper communication network should, in a very fast manner, recognize the setback, calculate the necessary measures to follow and act on the calculated decisions. For each different electrical network setup, the requirements for the self-healing capability might be different (for instance, some electrical systems may require extremely tight delay bounds, whereas the others do not). The co-simulation of the two different networks will enable to comparing the capabilities of a communication network through the requirements imposed by different electrical systems.

Figure 49:
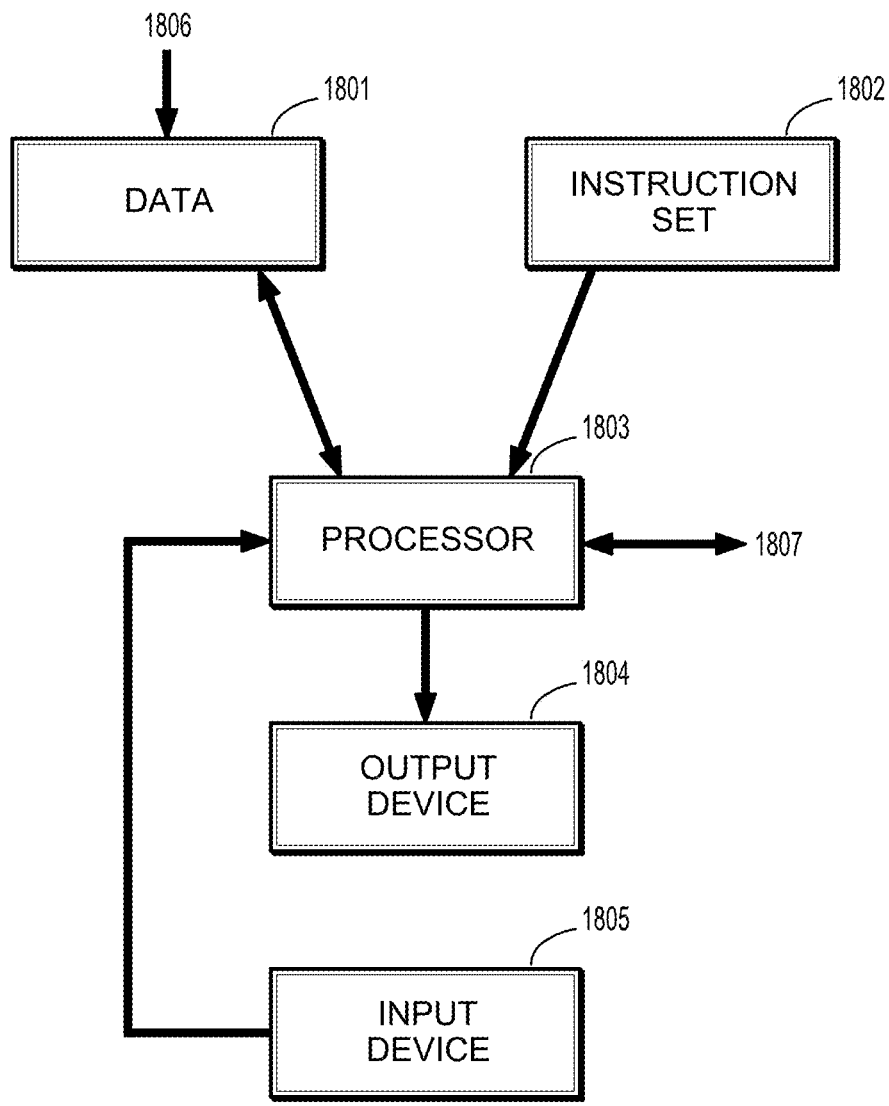
FIG. 49 illustrates a processor based system enabled to perform steps of methods provided in accordance with various aspects of the present invention.

The methods as provided herein are, in one embodiment of the present invention, implemented on a system or a computer device. Thus, steps described herein are implemented on a processor, as shown in FIG. 49. A system illustrated in FIG. 49 and as provided herein is enabled for receiving, processing and generating data. The system is provided with data that can be stored on a memory 1801. Data may be obtained from a file such as a comma-separated values (CVS) file which contains a behavior of an asset in a Smart Grid. Data may also be collected from assets over time and stored in a file which may then be provided to the system. Data may be provided on an input 1806. Such data may be asset data, configuration data or any other data that is useful in a Smart Grid communication assessment system as provided herein. The processor is also provided or programmed with an instruction set or program executing the methods of the present invention that is stored on a memory 1802 and is provided to the processor 1803, which executes the instructions of 1802 to process the data from 1801. Data, such as communication delay data or any other data provided by the processor can be outputted on an output device 1804, which may be a display to display images or data related to a performance of a communication system or to a data storage device. The processor also has a communication channel 1807 to receive external data from a communication device and to transmit data to an external device. The system in one embodiment of the present invention has an input device 1805, which may include a keyboard, a mouse, a pointing device, one or more cameras or any other device that can generate data to be provided to processor 1803.

Several protocols that can be applied in a communication network to support Smart Grid have been mentioned herein. Other communication protocols and/or technologies that can be applied include: VHF/UHF Digital Radio, 900 MHz DSS Radio, 900 MHz RF Mesh, 2.4 GHz RF Mesh, Cellular (LTE), Narrowband P2MP, Long Range Wi-Fi, Wi-Fi Mesh, Narrowband PLC, Broadband PLC, Unlicensed and Licensed Microwave and WiMAX. It is to be understood that use of other technologies and protocols, including Internet protocols is possible and fully contemplated.

The processor can be dedicated or application specific hardware or circuitry. However, the processor can also be a general CPU or any other computing device that can execute the instructions of 1802. Accordingly, the system as illustrated in FIG. 49 provides a system for processing data resulting from a Smart Grid related data source and is enabled to execute the steps of the methods as provided herein as one or more aspects of the present invention to provide data related to a performance of a Smart Grid communication system operating in a predefined configuration and pre-set constraints.

In one embodiment of the present invention, the system conducts a simulation or modeling of at least a communications network related or in support of an electricity utility which includes preferably Smart Grid elements in a geography with different characteristics, different assets and different usages and with different amounts and times of generation of data traffic associated with different Smart Grid or utility applications as provided herein and with different conditions of operations.

One condition of operations is the time of operations that is simulated. For instance, the simulation on the system may in one embodiment of the current invention simulate an operational period of at least 24 hours. This allows an analysis of the expected network performance during such a period. One may also simulate the network for a period that is shorter, for instance an operational period of 1 hour, or a period of 2 hours, or a period of 3 hours, or a period of at least 4 hours. During the simulation one can simulate the entire network and/or utility or just a part of it.

During the simulation one can also change the operational conditions of the environment, which affects the demand for electricity or which affects operational conditions such as power line interrupts and the like. For instance, one may make different assumptions about environment conditions such a temperature, which at high temperatures may drive up the demand for power for air-conditioning and may shift demand for other appliances.

One may also simulate power line interruptions and assess the consequences on the demands on the network over different periods.

In accordance with one or more aspects of the present invention a novel approach for Network Traffic Profile Aggregation for Efficient Discrete Event Smart Grid Network Simulations has been provided. Steps of various methods according to the novel approach have been implemented on a processor based system using controlled experimentation using datasets for a variety of network configurations. Thus, novel systems and methods and steps implementing the methods have been described and provided herein for Network Traffic Profile Aggregation for Efficient Discrete Event Smart Grid Network Simulations.

In accordance with one aspect of the present invention a system for co-simulation has been provided. In one embodiment of the present invention at least a first and a second system as illustrated in FIG. 49 are provided, wherein the first system provides data to the second system.

A further explanation on consolidation is provided in the following.

Figure 50:
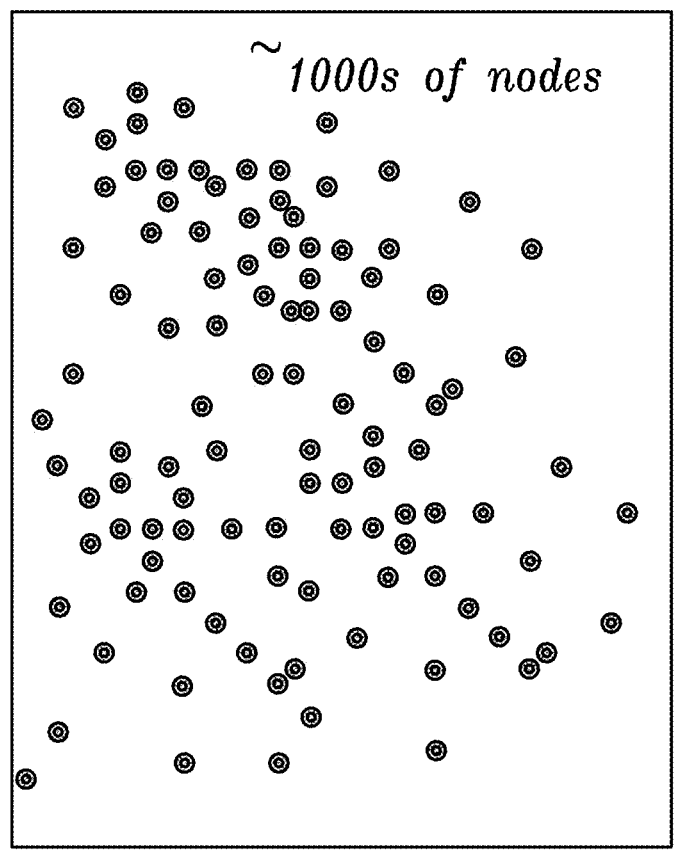
FIGS. 50-53 illustrate steps in accordance with one or more aspects of the present invention.
Figure 51:
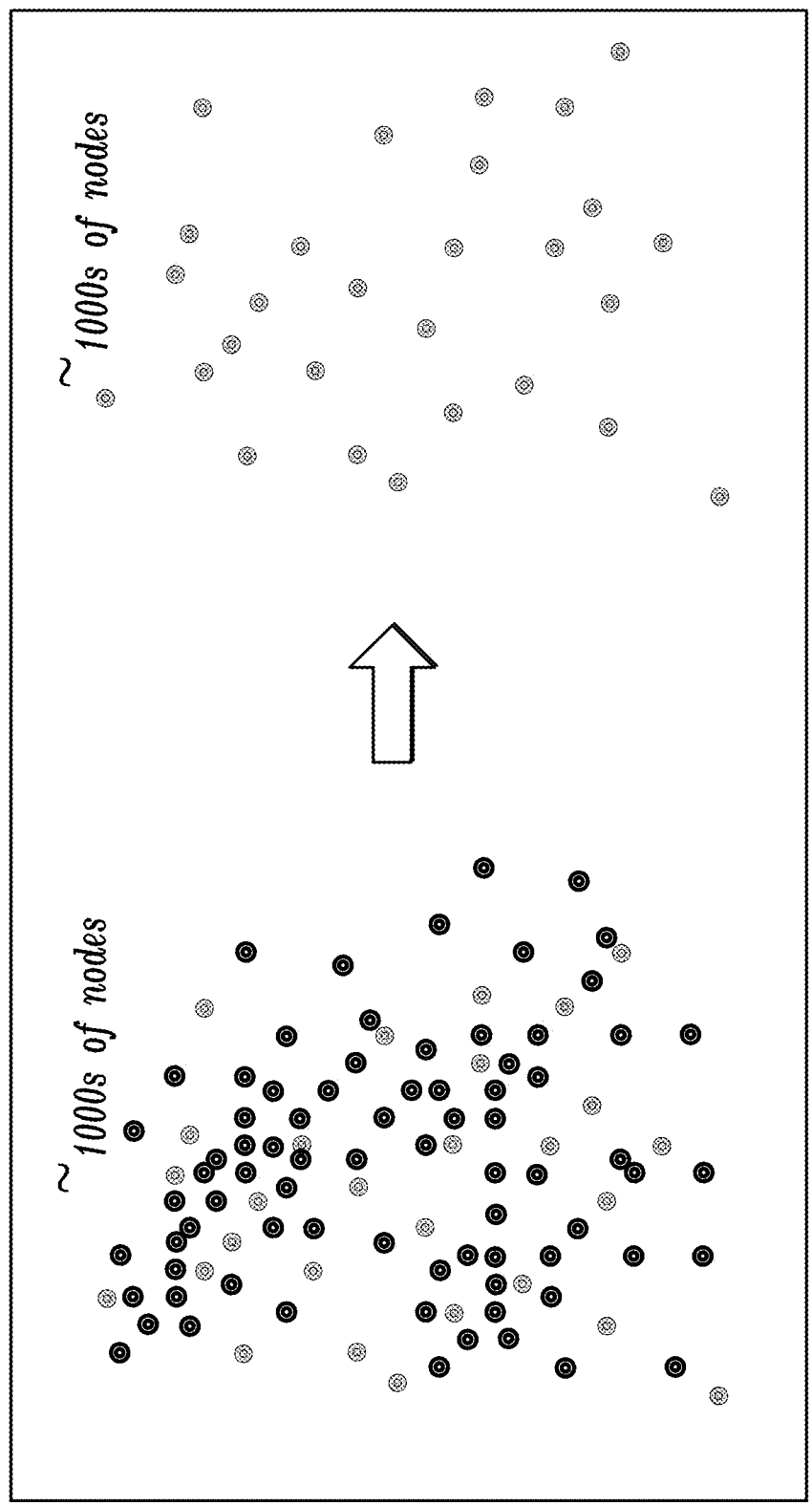

FIG. 50 illustrates in diagram a network that is large and that may be too large with too many traffic generating nodes to simulate on a processor in a discrete event simulator in a reasonable amount of time. The question is if a subset of the network can be found by reducing the number of nodes so that the simulation time is improved but with the same or similar results observed as in the original set-up. This is illustrated in FIG. 51.

Figure 52:
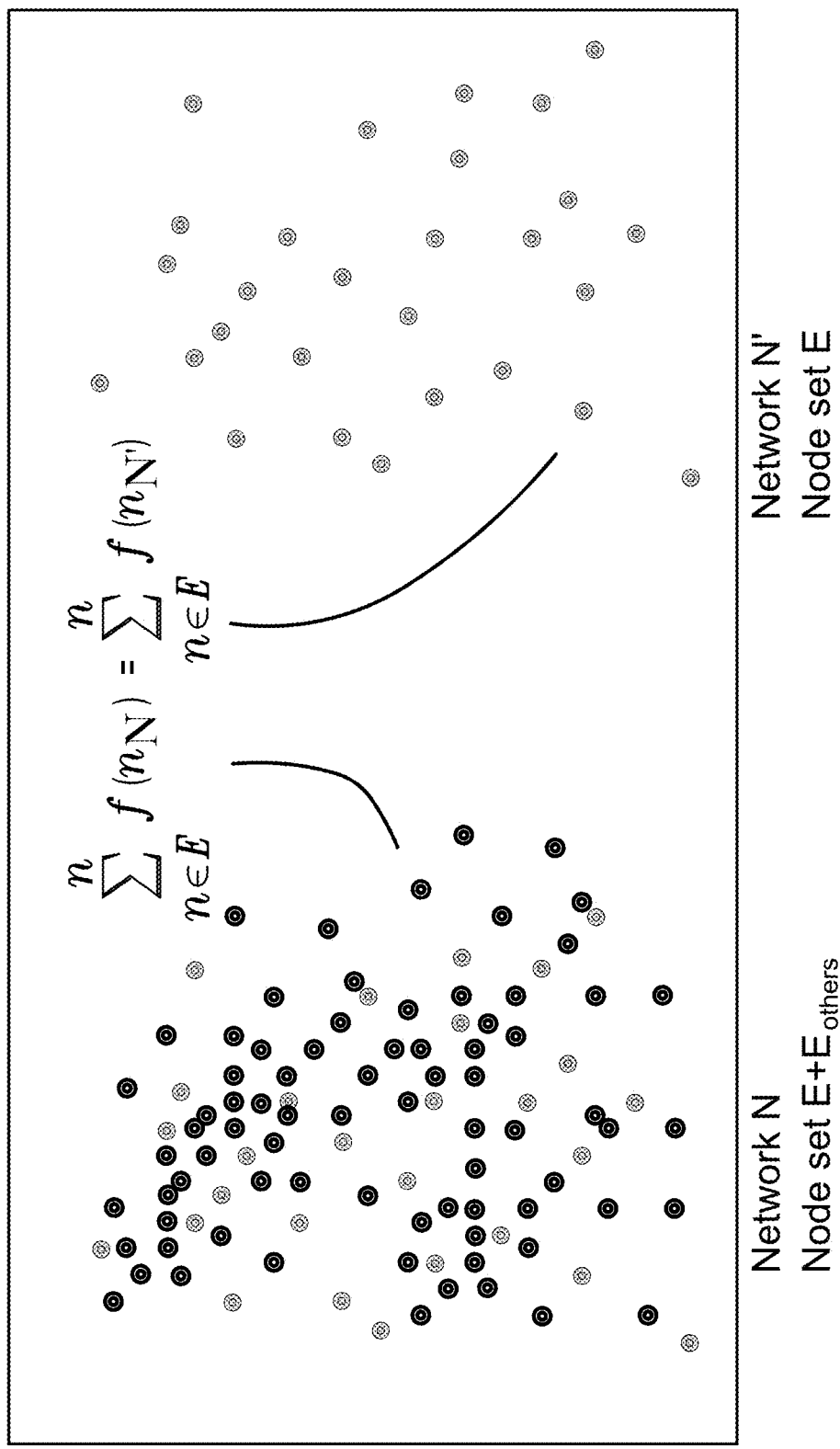

One question to be answered is "what is meant by the same results?" This is illustrated in FIG. 52. It shows a first network N with $E+E_{other}$ nodes at the left side and an equivalent network N' with E nodes at the right hand side with a formula that expresses a measurement of interest (f) which should be the same in Network N and Network N' for the same nodes in both networks. One would like the result of the two networks N and N' to be the same or:

$$\sum_{n \in E} f(n_N) = \sum_{n \in E} f(n_{N'}).$$

Figure 53:
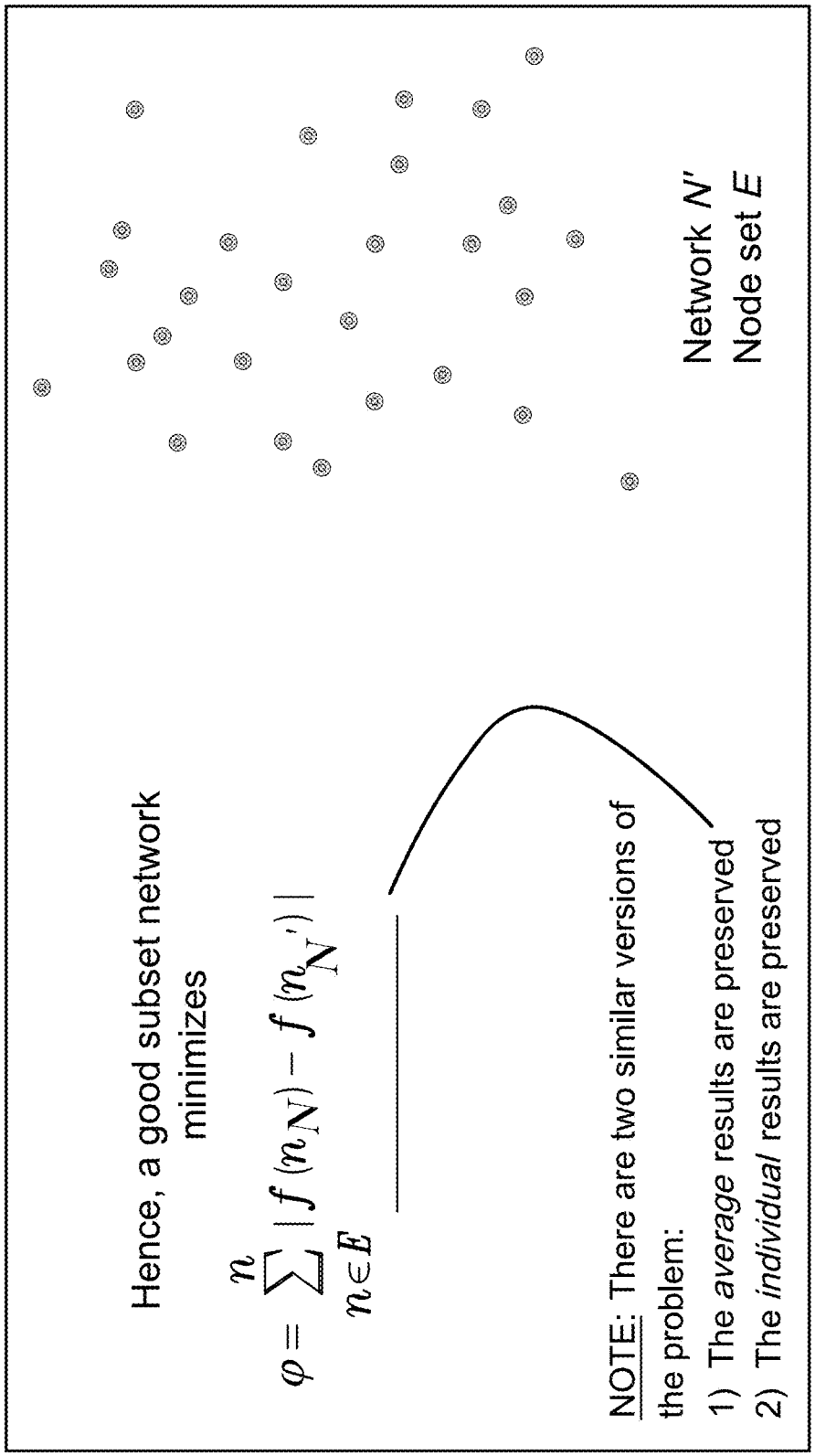

FIG. 53 illustrates that a good subset network minimizes $$\varphi = \sum_{n \in E}^{n} |f(n_N) - f(n_{N'})|.$$

Again the measure of interest (f) for the same node should be the same in network N and network N'. There are two similar versions of the problem (1) the average results are preserved and (2) the individual results are preserved.

The concept of binning is applied to obtain the reduction. Ideally, it is possible to simulate a part of the original network setup and get similar results provided that (1) the transmission times are distributed uniformly over time and (2) the nodes are of a similar nature in traffic generation characteristics. Smart Grid applications support both of these assumptions.

Assume that a network of N devices connects or transmits to a concentration point such as a wireless communication tower. The N devices all send packets of data to the tower. For instance all communication of the devices to the tower is one packet per period T per device. (In another example each communication has p packets or no more than p packets). Each packet has a fixed number of symbols or about a same number of symbols or bits. One assumption is that the transmission times of the packets are distributed uniformly over T and that each device has identical or close to identical transmission characteristics, including size of the packet and channel characteristics between the device and the concentration point (the tower).

The discrete event simulator has to simulate each device during its simulation. In case of the N devices over a period of time, a number of devices will generate traffic or packets and a complementary number will generate no traffic. In accordance with an aspect of the present invention devices are arranged in bins, in such a manner that N/k devices that generate traffic during a period T/k will be placed in one of k bins and the remaining N-N/k devices that do not transmit during this period, but do transmit in one of other periods during the period T are placed in different bins. Accordingly, the N devices will be arranged in k bins, each bin containing N/k devices, each bin transmitting the traffic of N/k devices in a period Tik which is due over a period T.

In accordance with an aspect of the present invention one bin $b_p$, Which represents N/k devices which transmit within a period T/k, for instance from $t_p:t_{p+1}$ is simulated in a discrete simulator to generate simulated traffic during the period $t_p:t_{p+1}$. The traffic simulated over that period is deemed to be representative for the traffic generated during the other bins in period T. One can then replicate the generated traffic generated during $t_p:t_{p+1}$ (k-1) times and use the (k-1) replicated data sets as simulation data for the remaining (k-1) bins in period T.

In accordance with a further aspect of the present invention one simulates a network over a period d*T covering for instance a period of one or more days. In that case, one simulates a single bin of the network for d different periods which are preferably distributed uniformly over d*T and replicates each of the simulated traffic of that bin (k-1) times to provide data that represents the complementary bins not covered by the simulated bin. In this manner a significant reduction in simulation time is obtained.

Since data collection of devices such as smart meters need not occur in real-time, one can actually force or program meters to transmit on pre-programmed times so that the transmission times of the meters are distributed uniformly.

One can re-state the problem as follows: How to decrease the number of users in a simulation environment without compromising the end-to-end characteristics? For instance one has currently N nodes and one wants just N/k nodes to simulate.

Solution 1 is Cluster-R: Randomly remove half of the users so that the resulting scenario has a smaller network size.

Solution II is cluster-G: Remove the nodes according to their geographical proximity, i.e. remove only if there are other nodes that can represent the geographical location.

It has been explained above and illustrated in FIG. 39 how one, in accordance with one or more aspects of the present invention, can aggregate communication data, for instance in the form of data packets, generated by different devices and related to different Smart Grid applications related to a node in a network, as communication data that is provided by the node as a result of the different sources. One can set therein, in accordance with one or more aspects of the present invention, the traffic generating parameters of the sources, such as time of generation, size of packets, transmission time, delay, random variables that determine traffic from the source and the like. As a result it appears that the node is a multi-application single source that provides an aggregated data stream.

The approach as illustrated in FIG. 39 allows the discrete event simulator to simulate a network from the level of the aggregating nodes, even if it is not possible to simulate individual sources.

In accordance with an aspect of the present invention, the data aggregation at a node level is applied to determine a preferred source rate or user rate in the network at a level below the node that is sufficient to be sustained by the capacity of the higher level network, such as the backbone between a node and a control center.

For instance, electrical devices and meters (or users) in a Smart Grid generate data, determined by certain parameters, that is aggregated at a node which is called a Base Station. The Base Station sends the aggregated communication data to a higher order node for instance called a Control Station over a backbone connection. The Base Station is also called an aggregation node and the Control Station is also called a receiving node.

Figure 55:
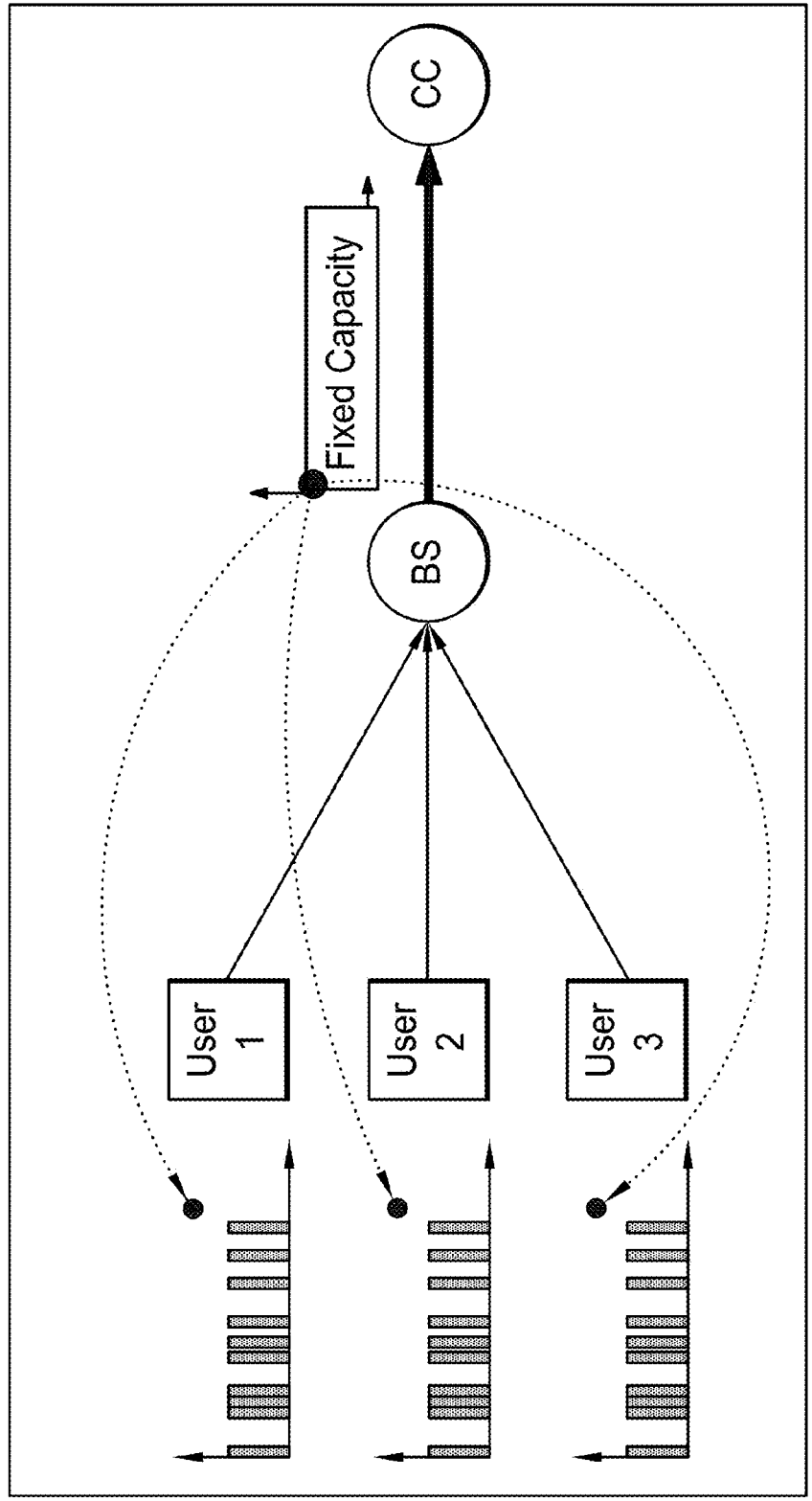
FIG. 55 illustrates use of an aggregation model in an electrical utility in accordance with an aspect of the present invention.

One issue that has to be addressed is what data traffic from the Base Station to the Control Center can be sustained by a communication channel between the Base Station and the Control Center, as illustrated in FIG. 55. In one embodiment of the present invention the communication channel may have a fixed capacity. The performance of the network is characterized by a reception rate of packets sent from the sources and received at the Control Center. For instance a reception rate is 90%. That is: from all packets sent at least 90% are received correctly.

The reception rate is a quality measure for the network or the channel (if the channel is the quality bottleneck). So, under one operating assumption a Smart Grid utility can be operated adequately if no more than 10% of the packets are lost. Other reception rates, such as 99%, 95% and 97% correct reception rates are also possible of course. Other quality measures are of course also possible and may include bandwidth, error rates, SNR or any other transmission quality measure. However, it is convenient to express the quality measure into parameters than can be set at the source.

Figure 54:
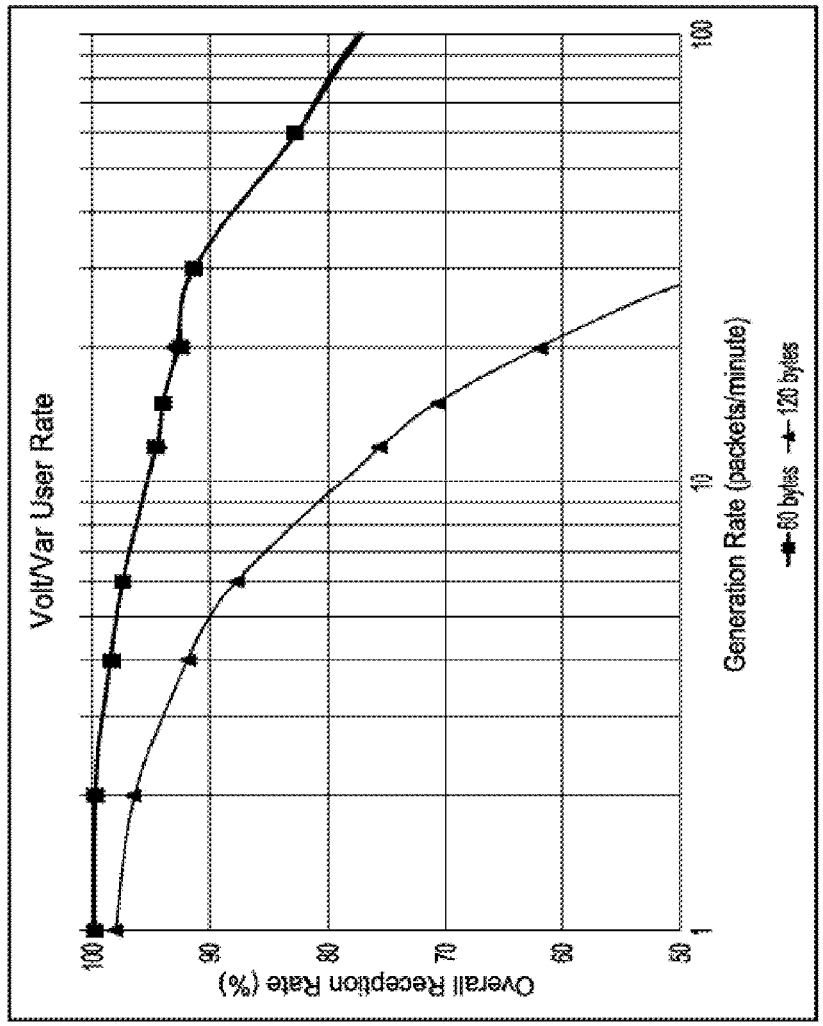
FIG. 54 illustrates a graph to determine a network quality measure in an electrical utility in accordance with one or more aspects of the present invention.

The quality measure is illustrated in FIG. 54. The graph shows an overall reception rate at a set capacity of the communication channel between BS and CC as a function of the packet generation rate of sources (or users) in the network. One can check that a 90% reception rate is sustainable over the channel at an individual generation rate or user rate of 4 packets of 120 bytes per minute (or 1 packet of 120 bytes per 15 seconds) or over 30 packets of 60 bytes per minute (at least one packet of 60 byte every 2 seconds). Accordingly, a quality measure of a channel corresponds to a user rate of one or more devices in a traffic model. Based on the overall data requirements of the applications one can decide which transmission rate or user rate is preferable under a certain traffic model.

If a certain user rate or parameter setting under a traffic model does not meet the constraints of the channel one can modify one or more parameters of a traffic source. One may also modify the assumed model of the network, applications and/or protocols to meet the channel constraint. If the number of packets and their distribution over time are known one can apply a transmission model implemented on a processor to determine a reception rate. If it is known or it can be calculated how the aggregated packets and their distribution change due to change in source parameters (such as user rate of a device) one can determine curves (such as illustrated in FIG. 54) that map reception rate against user rate. One further input may be a preferred data rate. For instance one may want under certain conditions longer packets generated at a lower rate rather than small packets with a high user rate. Under different conditions with for instance uniformly operating devices one may prefer a constant and even load on the channel by rapidly generating smaller packets. This allows for an optimization approach based on existing boundary conditions for the Smart Grid.

In one embodiment of the present invention one may reconfigure parameters of transmitting devices based on changed conditions.

The situation is thus that: (a) the packet generation application at individual devices is based on the particular application definition, wherein each type of device can hace different application(s); (b) individual devices send packets to a Base Station or aggregation node; (c) multiple Base Stations forward packets to a final destination or receiving node (Control Center).

Assuming the capacity of the BS-CC channel is fixed, one has to select the preferred parameters of the data generating sources in such a way that generated traffic meets the constraints of the channel. In accordance with an aspect of the present invention the aggregation model is applied to not traffic generating parameters of the sources to accommodate the constraints of the channel.

In one embodiment of the present invention at least some applications in the network have a constrained generating behavior which has to be accommodated by the channel. In accordance with an aspect of the present invention the capacity or capacity determining parameters of the channel between Base Station and Control Center, such as bandwidth, error rate, modulation techniques, transmission medium and the like, are determined based on the expected generated traffic by the sources. For instance, a channel between a Base Station and a Control Center may need to be newly installed or may be required to be upgraded due to Smart Grid applications at traffic generating sources in an electric utility. In one embodiment of the present invention one may simulate with aggregated traffic in the utility and determine if an existing channel can sustain expected traffic or if source parameters can be modified to accommodate the existing capacity under pre-set quality requirements.

In one embodiment of the present invention one can determine the required capacity of the channel under different traffic assumptions in the utility to support pre-set quality requirements.

In one embodiment of the present invention a quality measure is an overall reception rate of packets. In one embodiment of the present invention a quality measure is an overall reception rate of packets of at least 90%.

Figure 56:
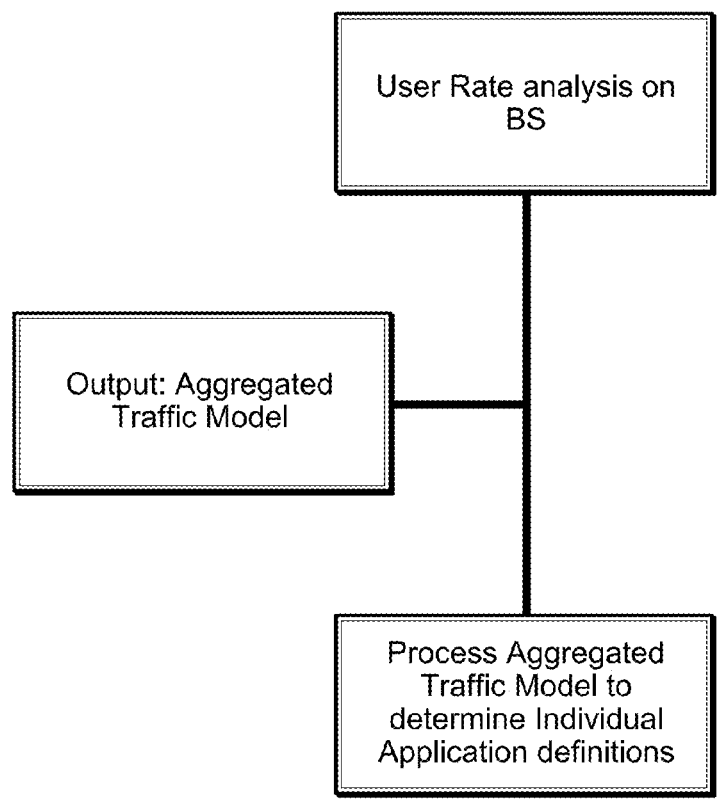
FIG. 56 illustrates a model for user rate analysis in a network for an electrical utility in accordance with an aspect of the present invention.

When studying the BS to CC link (which is constrained by the backbone technology or capacity), a user rate analysis as provided above allows to determine the utility application definition or parameter setting of one or more utility applications that the BS can have or aggregate. The Base Station in fact has no application, but produces the combination of all individual packets generated by all the individual devices or sources connected to the Base Station. As illustrated in FIG. 56 and in accordance with an aspect of the present invention, one can use the Base Station aggregate traffic model, as explained earlier, to determine the acceptable application definitions or application parameters for the individual applications to address constraints set by the capacity of the communication channel between Base Station and Control Center.

Thus, a method is provided for determining one or more sources for traffic over the communication network by selecting one or more parameters associated with each of the one more sources of traffic for each of the plurality of communication protocols, the one or more parameters including at least a packet size and a transmit time; that includes the steps of creating a traffic model for the one or more sources; generating simulated traffic for the one or more sources of traffic based on the traffic model that is aggregated at an aggregation node; setting a desired quality measure for the simulated traffic received at a receiving node in communication with the aggregation node; and modifying at least one parameter of the one or more traffic sources to satisfy the required quality measure.

In accordance with an aspect of the present invention, the quality measure can be related to a user rate of the one or more sources under a traffic model. The quality measure can be an overall packet reception rate.

The overall desired packet reception rate can be designated to be at least 90%.

The system that implements this and other methods described herein includes a memory to store results and programming information and a processor in communication with the memory to perform each of the steps specified herein.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

The following references provide background information generally related to the present invention and are hereby incorporated by reference: [1] G. Deconinck, "An evaluation of two-way communication means for advanced metering in Flanders (Belgium)," in Instrumentation and Measurement Technology Conference Proceedings, 2008. IMTC 2008. IEEE. May 2008. pp. 900-905; [2] D. Hart, "Using AMI to realize the Smart Grid." in Power and Energy Society General Meeting—Conversion and Delivery of Electrical Energy in the $21^{st}$ Century, 2008 IEEE, July 2008. pp. 1-2; [3] S. Valero. M. Ortiz. C. Senabre, C. Alvarez, F. Franco, and A. Gabaldon, "Methods for customer and demand response policies selection in new markets," Generation, Transmission Distribution, IET, vol. I, no. 1. pp. 104-110, January 2007; [4] A. Smit. "Distribution Feeder Automation using IEC61850 GOOSE Messaging over WIMAX Wireless Communications,"; [5] "United States Department of Energy, Energy Information Administration, 2011 Energy Outlook."; [6] S. Galli, A. Scaglione and Z. Wang, "For the grid and through the grid: The role of power line communications in the smart grid," CoRR, vol. abs/1010.1973, 2010.

While there have been shown, described and pointed out fundamental novel features of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the scope of the claims.

The invention claimed is:

1. A method to simulate a communication network in a planning phase with a plurality of nodes in a Smart Grid electricity network, comprising a processor performing the steps:
   importing geographical terrain data and a topology of the communication network that determines a plurality of electrical devices in the Smart Grid electricity network as sources for traffic over the communication network in the planning phase by setting one or more parameters associated with each of the sources of traffic for each of a plurality of communication protocols, the one or more parameters including at least a packet size and a transmit time, the plurality of electrical devices being selected from the group performing Smart Grid applications consisting of delivery management and optimization, demand management and optimization and asset management and optimization;
   setting transmit times for the one or more sources of traffic for each of the plurality of communication protocols by selecting one or more parameters including at least a simulation time and a delay;
   creating inter arrival times, weights and distributions of traffic sources;
   creating a plurality of traffic models for the one or more sources based on each of the prior steps;
   inputting each of the plurality of traffic models into a network simulator that is a discrete event simulator that simulates a traffic of the Smart Grid electricity network containing thousands of electrical devices; and
   determining a quality measure for simulated traffic for each of the plurality of traffic models executed by the discrete event network simulator.

2. The method of claim 1, further comprising making recommendations of a communication model based on an output of the network simulator.

3. The method of claim 2, wherein the network simulator is an OPNET® network simulator.

4. The method of claim 2, wherein the communication network is a wireless mesh network.

5. The method of claim 2, further comprising:
   the network simulator performing a first simulation based on a first data file;
   the network simulator performing a second simulation based on a second data file; and
   comparing a configuration of the communication network based on the first data file with a configuration of the communication network based on the second data file.

6. A system to simulate a communication network with a plurality of nodes in a Smart Grid electricity network, comprising:
   a memory storing a plurality of communication protocols, each protocol related to a Smart Grid application;
   a processor in communication with the memory, the processor programmed to perform the steps:
      determining one or more sources for traffic over the communication network by selecting one or more parameters associated with each of the one more sources of traffic for each of the plurality of communication protocols, the one or more parameters including at least a packet size and a transmit time;
      creating a traffic model for the one or more sources;
      generating simulated traffic for the one or more sources of traffic based on the traffic model that is aggregated at an aggregation node;
      setting a desired quality measure for the simulated traffic received at a receiving node in communication with the aggregation node; and
      modifying at least one parameter of the one or more traffic sources to satisfy the required quality measure; and wherein
   the quality measure is an overall packet reception rate of at least 90%.

7. A method to simulate a communication network with a plurality of nodes, including an aggregation node connected by a communication channel with a receiving node in a Smart Grid electricity network, each node being enabled to transmit data packets in support of a plurality of Smart Grid applications, comprising:
   a processor determining an aggregation of data packets representing data traffic at the aggregation node in the communication network as a result of a Smart Grid application installed on a plurality of devices, the data traffic being determined by at least one parameter at each of the plurality of devices;
   a discrete event simulator that simulates a traffic in the Smart Grid electricity network with thousands of devices performing a first simulation based on an imported first data file representing geographical terrain data, a network topology and traffic data at the aggregation node in accordance with a first plurality of parameters;
   the discrete event simulator performing a second simulation, based on a second data file representing data traffic at the aggregation node in accordance with a second plurality of parameters; and
   comparing a configuration of the communication network based on the first data file with a configuration of the communication network based on the second data file;
   setting a desired quality measure for data packets transmitted from the aggregation node to the receiving node;
   determining if the desired quality measure is met; and
   modifying the at least one parameter to satisfy the quality measure if the desired quality measure is not met, wherein the quality measure is an overall packet reception rate of at least 90%.

8. The method of claim 7, further comprising:
   modifying the communication channel to meet the quality measure.

9. The method of claim 7, wherein the processor obtains a statistical distribution of data packets representing data traffic at a node in the communication network as a result of a Smart Grid application from a stored traffic model.

10. The method of claim 7, wherein the communication network is a wireless mesh network.

* * * * *